(12) United States Patent  
Lin et al.

(10) Patent No.: US 12,492,127 B2  
(45) Date of Patent: Dec. 9, 2025

(54) CARBON MATERIAL, METHOD FOR PREPARING THE SAME, AND SECONDARY BATTERY AND ELECTRICAL DEVICE COMPRISING THE SAME

(71) Applicant: Contemporary Amperex Technology (Hong Kong) Limited, Hong Kong (CN)

(72) Inventors: Xieji Lin, Ningde (CN); Rui Shen, Ningde (CN); Libing He, Ningde (CN)

(73) Assignee: Contemporary Amperex Technology (Hong Kong) Limited, Hong Kong (CN)

( * ) Notice: Subject to any disclaimer, the term of this patent is extended or adjusted under 35 U.S.C. 154(b) by 0 days.

(21) Appl. No.: 18/964,714

(22) Filed: Dec. 2, 2024

(65) Prior Publication Data

US 2025/0091881 A1  Mar. 20, 2025

Related U.S. Application Data

(63) Continuation of application No. PCT/CN2022/134445, filed on Nov. 25, 2022.

(51) Int. Cl.
*C01B 32/21* (2017.01)
*H01M 4/587* (2010.01)

(52) U.S. Cl.
CPC .............. *C01B 32/21* (2017.08); *H01M 4/587* (2013.01); *C01P 2002/72* (2013.01);
(Continued)

(58) Field of Classification Search
None
See application file for complete search history.

(56) References Cited

U.S. PATENT DOCUMENTS 4,294,893 A * 10/1981 Iemmi ............... H01M 4/96  
 429/510  
12,444,733 B2 * 10/2025 Baek ............... H01M 4/587  
(Continued)

FOREIGN PATENT DOCUMENTS

CN  101350407 A  1/2009  
CN  107814382 A  3/2018  
(Continued)

OTHER PUBLICATIONS

Seehra et al.; Detection and Quantification of 2H and 3R Phases in Commercial Graphene-Based Materials; vol. 95, pp. 818-823, Dec. 2015.*

(Continued)

*Primary Examiner* — Guinever S Gregorio  
(74) *Attorney, Agent, or Firm* — K&L Gates LLP

(57) ABSTRACT

The present application provides a carbon material, a method for preparing the same, and a secondary battery and an electrical device comprising the same. The carbon material includes a pore structure, wherein the carbon material has 3R and 2H phases and satisfies $0 < I_{3R(101)}/I_{2H(004)} \leq 0.100$, in which $I_{3R(101)}$ is the diffraction peak intensity of 101 crystallographic plane of the 3R phase in the X-ray diffraction pattern of the carbon material, and $I_{2H(004)}$ is the diffraction peak intensity of 004 crystallographic plane of the 2H phase in the X-ray diffraction pattern of the carbon material. The carbon material provided in the present application can make the secondary battery have high initial columbic efficiency and also good cycling and dynamic performances.

9 Claims, 4 Drawing Sheets

(52) U.S. Cl.
CPC ...... *C01P 2002/77* (2013.01); *C01P 2004/61* (2013.01); *C01P 2006/11* (2013.01); *C01P 2006/12* (2013.01); *C01P 2006/40* (2013.01)

(56) References Cited

U.S. PATENT DOCUMENTS

| | | | |
|---|---|---|---|
| 2011/0028708 | A1 | 2/2011 | White et al. |
| 2017/0155126 | A1* | 6/2017 | Park ...................... H01M 4/043 |
| 2020/0031671 | A1 | 1/2020 | Zhamu et al. |
| 2020/0031677 | A1 | 1/2020 | Zhamu et al. |
| 2021/0280855 | A1* | 9/2021 | Lee ....................... H01M 4/587 |
| 2022/0393171 | A1* | 12/2022 | Zhou ....................... C01B 32/21 |
| 2024/0055607 | A1* | 2/2024 | Ishiwatari ........... H01M 10/052 |

FOREIGN PATENT DOCUMENTS

| | | |
|---|---|---|
| CN | 107814383 A | 3/2018 |
| CN | 108565443 A | 9/2018 |
| CN | 113875048 A | 12/2021 |
| CN | 114365305 A | 4/2022 |
| CN | 114843508 A | 8/2022 |
| JP | 2019507715 | 3/2019 |
| JP | 2023504472 A | 2/2023 |
| JP | 2023544934 A | 10/2023 |
| JP | 2023545335 A | 10/2023 |
| JP | 2023550137 A | 11/2023 |
| KR | 1020210068497 A | 6/2021 |

OTHER PUBLICATIONS

The international search report and written opinion of ISA received in the counterpart international application PCT/CN2022/134445, mailed on Jun. 30, 2023.
The Notice of Reasons for Refusal received in the counterpart JP application No. 2024-566225, dated Jun. 9, 2025, 8 pages with English translation.
The Written Decision on Registration received in the counterpart KR application No. 10-2024-7037515, dated Jun. 25, 2025, 6 pages with English translation.

* cited by examiner

CARBON MATERIAL, METHOD FOR PREPARING THE SAME, AND SECONDARY BATTERY AND ELECTRICAL DEVICE COMPRISING THE SAME

CROSS-REFERENCE TO RELATED APPLICATIONS

This application is a continuation of International Application PCT/CN2022/134445, filed on Nov. 25, 2022, which is incorporated herein by reference in its entirety.

TECHNICAL FIELD

The present application belongs to the field of battery technology, and specifically relates to a carbon material and the method for preparing the same, and a secondary battery and an electrical device comprising the same.

BACKGROUNDS

In recent years, secondary batteries have been widely used in energy storage power systems such as hydropower, firepower, wind power, and solar power plants, as well as in various fields such as electric tools, electric bicycles, electric motorcycles, electric vehicles, military equipment, and aerospace. With the increasing applications of secondary batteries, people have posed serious challenges to the performance of secondary batteries, for example the requirement for a combination of energy density, dynamic performances, and service life of the secondary batteries. Negative electrode active materials are an important part of secondary batteries, because they affect the performances of the secondary batteries. At present, the negative electrodes active materials mainly includes graphite. However, the problem in the prior art is that the graphite having high capacity is difficult to have high initial columbic efficiency simultaneously, and thus is difficult to make the secondary batteries have good cycling and dynamic performances.

SUMMARY

The present application is intended to provide a carbon material, a method for preparing the same, and a secondary battery and an electrical device comprising the same. The carbon material provided in the present application can make the secondary battery have high initial columbic efficiency and also good cycling and dynamic performances.

A first aspect of the present application provides a carbon material comprising a pore structure, wherein the carbon material has 3R and 2H phases and satisfies $0 < I_{3R(101)}/I_{2H(004)} \leq 0.100$, in which $I_{3R(101)}$ is the diffraction peak intensity of 101 crystallographic plane of the 3R phase in the X-ray diffraction pattern of the carbon material, and $I_{2H(004)}$ is the diffraction peak intensity of 004 crystallographic plane of the 2H phase in the X-ray diffraction pattern of the carbon material.

During the research, the inventors have found that under the condition that both 3R phase crystalline carbon and 2H phase crystalline carbon exist in the carbon material, and the ratio of the diffraction peak intensity of 101 crystallographic plane of 3R phase to the diffraction peak intensity of 004 crystallographic plane of 2H phase satisfies $0 < I_{3R(101)}/I_{2H(004)} \leq 0.100$, there can be more active sites on the surface of carbon material particles, which can accelerate the transport of active ions. At the same time, the surface stability of carbon material particles is relatively high, which can effectively reduce surface side reactions and reduce the consumption of active ions. The carbon material provided in the present application includes a pore structure, which can reserve the expansion space necessary for the volume change of carbon material particles, thereby reducing the risk of carbon material particle breakage and generating new interfaces, and further reducing the side reactions and reducing the consumption of active ions. Therefore, the carbon material provided in the present application can balance high ion transport performance, high surface stability, and low volume change, thereby enabling the secondary battery comprising the same to combine high initial columbic efficiency and good cycling and dynamic performances.

In some embodiments of the present application, $0.005 \leq I_{3R(101)}/I_{2H(004)} \leq 0.100$, and optionally, $0.008 \leq I_{3R(101)}/I_{2H(004)} \leq 0.065$. Under the condition that the carbon material has $I_{3R(101)}/I_{2H(004)}$ further falling within the above range, it can better balance the high initial columbic efficiency and good cycling and dynamic performances of the secondary battery.

In some embodiments of the present application, the X-ray diffraction pattern of the carbon material does not include a peak position of (012) crystallographic plane of the 3R phase. Accordingly, the carbon material particles have fewer internal defects, which can further reduce the consumption of active ions and improve the initial columbic efficiency and cycling performance of secondary batteries.

In some embodiments of the present application, the carbon material comprises more than one pore structure having a pore area of equal to or greater than $0.15 \ \mu m^2$, and optionally more than one pore structure having a pore area of from $0.15 \ \mu m^2$ to $2.0 \ \mu m^2$. In further research, the inventors found that under the condition that the carbon material includes a pore structure having the aforementioned pore area, the pore structure can reserve the expansion space necessary for the volume change of carbon material particles, thereby reducing the risk of carbon material particle breakage and generating new interfaces, and further reducing the side reactions and irreversible capacity loss of secondary batteries; as a result, the cycling performance of secondary batteries is improved.

In some embodiments of the present application, the carbon material comprises an external zone and an internal zone located inside the external zone, the external zone refers to the zone formed by extending a distance of 0.25 L from the surface of the carbon material particles to the inside of the carbon material particles, L refers to the short axis length of the carbon material particles, the external zone has a total pore area denoted as $S_1$, and the internal zone has a total pore area denoted as $S_2$, wherein $S_2 > S_1$. Under the condition that the carbon material further satisfies $S_2 > S_1$, the carbon material can effectively reduce the irreversible capacity loss of the secondary battery, improve the capacity exertion characteristics of the secondary battery, and better balance the high initial columbic efficiency, as well as good cycling and dynamic performances of the secondary battery.

In some embodiments of the present application, $1.5 \leq S_2/S_1 \leq 420$, and optionally, $2 \leq S_2/S_1 \leq 300$. Under the condition that $S_2/S_1$ further satisfies the above condition, the secondary battery can better balance the high initial columbic efficiency, and good cycle performance and dynamic performances.

In some embodiments of the present application, $0.01 \ \mu m^2 \leq S_1 \leq 5.0 \ \mu m^2$, and optionally, $0.02 \ \mu m^2 \leq S_1 \leq 4.5 \ \mu m^2$. On the one hand, the carbon material particles can have a more stable structure, avoiding electrolyte to infiltrate into the pore structure inside the carbon material particles as much as possible, thereby reducing the side reactions and reducing the consumption of active ions by SEI membrane formation inside the carbon material particles. On the other hand, the transport performance of active ions and electrons will not be affected.

In some embodiments of the present application, $2.5 \ \mu m^2 \leq S_2 \leq 25.0 \ \mu m^2$, and optionally, $3.0 \ \mu m^2 \leq S_2 \leq 22.5 \ \mu m^2$. On the one hand, sufficient and stable expansion space can be reserved for the volume change of the carbon material particles, thereby reducing the risk of the carbon material particle breakage and generating new interfaces, reducing the side reactions on the new interface surface, and reducing the consumption of active ions by SEI film formation on the new interface surface. On the other hand, the capacity and initial columbic efficiency of carbon materials can be improved.

In some embodiments of the present application, $L \geq 4$ am, and optionally, $4 \ \mu m \leq L \leq 20 \ \mu m$.

In some embodiments of the present application, the pore structure in the external zone of the carbon material has an area of less than $0.15 \ \mu m^2$, and optionally less than or equal to $0.10 \ \mu m^2$. By controlling the area of the pore structure in the external zone of the carbon material within the above range, the external zone of the carbon material can have a dense structure, which can effectively improve the structural stability of the carbon material, avoid electrolyte infiltration into the pore structure inside the carbon material particles as much as possible, and thus effectively improve the cycling performance of the secondary battery.

In some embodiments of the present application, the internal zone of the carbon material includes more than one pore structure having an area of greater than or equal to $0.15 \ \mu m^2$, and optionally includes more than one pore structure having an area of from $0.15 \ \mu m^2$ to $2.0 \ \mu m^2$. By including the pore structure of the above mentioned size in the internal zone of the carbon material, sufficient and stable expansion space can be reserved for the volume change of the carbon material particles, thereby reducing the risk of the carbon material particle breakage. On the other hand, the compaction density of carbon materials and increase the energy density of the secondary battery can be improved.

In some embodiments of the present application, the specific surface area of the carbon material is from $0.6 \ \mu m^2/g$ to $2.5 \ \mu m^2/g$, and optionally from $0.8 \ \mu m^2/g$ to $2.4 \ \mu m^2/g$. The carbon material of the present application has a relatively low specific surface area and relatively low surface activity, which can reduce the consumption of active ions in SEI film formation, improve the initial columbic efficiency of the carbon material, and improve the cycling performance of the secondary battery.

In some embodiments of the present application, the volume distribution particle size Dv50 of the carbon material is from $6 \ \mu M$ to $30 \ \mu m$, and optionally from $8 \ \mu m$ to $25 \ \mu m$.

Under the condition that the volume distribution particle size and particle size Dv50 of carbon materials are within the above range, it is beneficial to improve the transport performance of active ions and electrons, thereby further improving the cycling and dynamic performances of secondary batteries.

In some embodiments of the present application, the particle size distribution (Dv90-Dv10)/Dv50 of the carbon material is from 0.90 to 1.50, and optionally from 0.90 to 1.45. Under this circumstances, it is beneficial for improving the compaction density of carbon materials, and in turn enhance the energy density of secondary batteries.

In some embodiments of the present application, the graphitization degree of the carbon material is from 93% to 98.5%, and optionally from 94% to 98%. Under the condition that the graphitization degree of carbon materials is within the above range, it is beneficial for secondary batteries to balance high energy density, good cycling performance, and dynamic performances.

In some embodiments of the present application, the morphology of the carbon material includes one or more of blocky, spherical, and quasi-spherical shapes.

In some embodiments of the present application, the tap density of the carbon material is from $0.8 \ g/cm^3$ to $1.20 \ g/cm^3$, and optionally from $0.85 \ g/cm^3$ to $1.18 \ g/cm^3$. Under the condition that the tap density of the carbon material is within the above range, the compaction density of the negative electrode plate can be increased, thereby increasing the energy density of the secondary battery. Moreover, the active ion and electron transport performance, and enhance the cycling and/or dynamic performances of secondary batteries can be improved.

In some embodiments of the present application, the powder compaction density of the carbon material under a pressure of 5000 kg is from $1.85 \ g/cm^3$ to $2.10 \ g/cm^3$, and optionally from $1.85 \ g/cm^3$ to $2.08 \ g/cm^3$. Under the condition that the powder compaction density of the carbon material is within the above range, the compaction density of the negative electrode plate can be improved, thereby increasing the energy density of the secondary battery. Moreover, the active ion and electron transport performance, and enhance the cycling and/or dynamic performances of secondary batteries can be improved.

In some embodiments of the present application, the capacity per gram of the carbon material is from 350 mAh/g to 370 mAh/g, and optionally from 355 mAh/g to 370 mAh/g. Under the condition that the capacity per gram of carbon materials is within the above range, the energy density of secondary batteries can be improved.

A second aspect of the present application provides a method for preparing a carbon material, comprising the following steps:

Step 1, providing a raw material having multiple pore structures;

Step 2, mixing the raw material with a filling material in a predetermined proportion homogeneously, and then holding at a first temperature $T_1$ for the first time $t_1$ to obtain an intermediate;

Step 3, holding the obtained intermediate at a second temperature $T_2$ for a second time $t_2$ to obtain a carbon material, wherein the carbon material comprises a pore structure, and the carbon material has 3R and 2H phases and satisfies $0 < I_{3R(101)}/I_{2H(004)} \leq 0.100$, in which $I_{3R(101)}$ is the diffraction peak intensity of 101 crystallographic plane of the 3R phase in the X-ray diffraction pattern of the carbon material, and $I_{2H(004)}$ is the diffraction peak intensity of 004 crystallographic plane of the 2H phase in the X-ray diffraction pattern of the carbon material.

In some embodiments of the present application, the raw material includes natural graphite, and optionally the natural graphite includes one or more of flake graphite, natural spherical graphite, and microcrystalline graphite.

In some embodiments of the present application, the volume distribution particle size Dv50 of the raw material is from $6 \ \mu m$ to $30 \ \mu m$, and optionally from $8 \ \mu m$ to $25 \ \mu m$.

In some embodiments of the present application, the OI value of the raw material is $\geq 4$, and optionally from 4 to 15.

In some embodiments of the present application, the volume distribution particle size Dv50 of the filling material is less than or equal to 6 μm, and optionally from 1 μm to 5 μm.

In some embodiments of the present application, the soften point temperature of the filling material is from 105° C. to 190° C., and optionally from 110° C. to 165° C.

In some embodiments of the present application, the coking value of the filling material is from 20% to 48%, and optionally from 25% to 40%.

In some embodiments of the present application, the filling material includes one or more of coal tar asphalt, petroleum asphalt, polymer compounds, and resins, and optionally includes petroleum asphalt.

In some embodiments of the present application, the mass ratio of the filling material to the raw material is (10 to 40):100, and optionally is (15 to 30):100.

By adjusting one or more parameters of the filling material such as the type, softening point, coking value, and addition amount thereof to fall within the above ranges, $I_{3R(101)}/I_{2H(004)}$ is advantageously adjusted to fall within the appropriate range, and the size and/or number of pores in the external zone and internal zone of the carbon material is/are advantageously adjusted to fall within the appropriate ranges. In addition, the filling material, after heating and melting, has a viscosity not too high, maintains good fluidity, and is not likely to bond the raw material particles. Accordingly, the aggregation of raw material particles in the subsequent preparation process can be reduced, thereby reducing the problem of increasing surface defects and side reactions of the carbon material particles due to the need for additional depolymerization processes.

In some embodiments of the present application, after mixing the raw material and filling material in a predetermined proportion homogeneously, they are heated to the first temperature $T_1$ by a staged heating process, optionally including a first heating process and a second heating process.

In some embodiments of the present application, the first heating process is heating to a temperature of from 200° C. to 300° C. and holding at this temperature for 1 to 3 hours.

In some embodiments of the present application, the second heating process is heating to the first temperature $T_1$ and holding at the first temperature $T_1$ for the first time $t_1$.

In some embodiments of the present application, the first temperature $T_1$ is from 700° C. to 1100° C., and optionally from 850 to 1100° C.

In some embodiments of the present application, the first time $t_1$ is from 1 hour to 5 hours, and optionally from 2 hours to 4 hours.

By adjusting one or more of the factors such as heating rate, first temperature, first time, and heating process to fall within the above ranges, it is beneficial to adjust the pore size and/or number of pores in the external zone and internal zone of carbon materials to fall within the appropriate range.

In some embodiments of the present application, the second temperature $T_2$ is from 1850° C. to 2650° C., and optionally from 2100° C. to 2480° C.

In some embodiments of the present application, the second time $t_2$ is from 1.5 h to 6 h, and optionally from 2 h to 5 h.

By adjusting the second temperature and/or time to fall within the above range, it is beneficial to adjust $I_{3R(101)}/I_{2H(004)}$ to fall within the appropriate range, and is beneficial to improve the cycling and/or dynamic performances of the secondary battery.

A third aspect of the present application provides a secondary battery, comprising a negative electrode plate comprising the carbon material according to the first aspect of the present application or the carbon material prepared by the method according to the second aspect of the present application.

A fourth aspect of the present application provides an electrical device, comprising the secondary battery according to the third aspect of the present application.

The carbon material prepared in the present application has fewer surface defects and/or bulk defects. The carbon material can balance high ion transport performance, high surface stability, and low volume change, thereby enabling the secondary battery comprising the same to balance high initial columbic efficiency, and good cycling and dynamic performances. The electrical device of the present application includes the secondary battery provided in the present application, and thus has at least the same advantages as the secondary battery.

BRIEF DESCRIPTION OF THE DRAWINGS

In order to provide a clearer explanation of the technical solution of the embodiments of the present application, a brief introduction will be given to the accompanying drawings required in the embodiments of the present application. It is evident that the accompanying drawings described below are only some embodiments of the present application. For those skilled in the art in the art, other accompanying drawings can be obtained based on the drawings without any creative effort.

Figure 1:
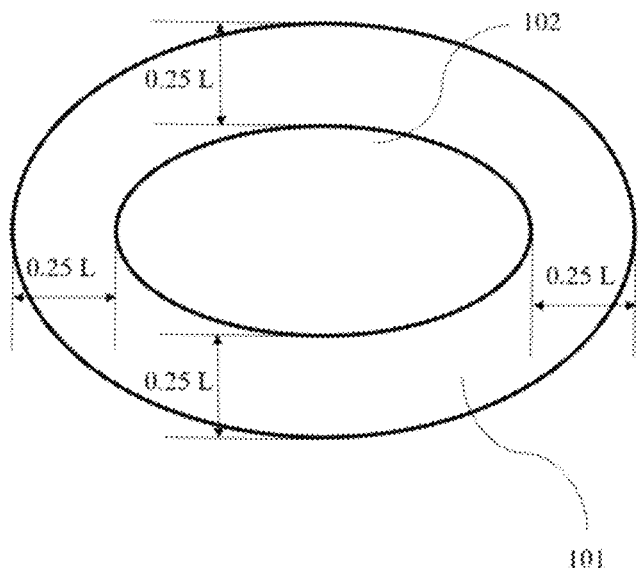
FIG. 1 is a schematic diagram of one cross-section image of the carbon material particles of the present application.

The accompanied drawings may not necessarily be drawn to the actual scale. The references in the figures are as follows: 1 battery pack, 2 upper box, 3 lower box, 4 battery module, 5 secondary battery, 51 shell, 52 electrode assembly, 53 cover, 100 carbon material, 101 external zone, 102 internal zone.

DETAILED DESCRIPTION

Hereinbelow, the embodiments of the carbon materials of the present application, the method for preparing the same, and the secondary battery and electrical device comprising the same will be described in detail with appropriate reference to the accompanied drawings. However, there may be situations where unnecessary detailed explanations may be omitted. For example, there are situations where detailed explanations of well-known matters are omitted and repeated explanations of the same structure are actually provided. This is to avoid the following explanations becoming unnecessarily lengthy and easy for those skilled in the art to understand. In addition, the accompanying drawings and the following explanations are provided for those skilled in the art to fully understand the present application and are not intended to limit the subject matter recorded in the claims.

The "scope" disclosed in the present application is limited in the form of a lower limit and an upper limit. The given scope is limited by selecting a lower limit and an upper limit, and the selected lower limit and upper limit the boundary of the special scope. The range limited in this way can include or exclude end values, and can be arbitrarily combined, that is, any lower limit can be combined with any upper limit to form a range. For example, if a range of 60-120 and 80-110 is listed for specific parameters, it is also expected to be understood as a range of 60-110 and 80-120. In addition, if the minimum range values 1 and 2 are listed, and if the maximum range values 3, 4, and 5 are listed, the following ranges can all be expected: 1-3, 1-4, 1-5, 2-3, 2-4, and 2-5. In the present application, unless otherwise specified, the numerical range "a-b" represents an abbreviated representation of any combination of real numbers between a and b, where a and b are both real numbers. For example, the numerical range "0-5" indicates that all real numbers between "0-5" have been listed in this article, and "0-5" is only a shortened representation of these numerical combinations. In addition, when expressing an integer with a parameter of ≥2, it is equivalent to disclosing that the parameter is, for example, integers 2, 3, 4, 5, 6, 7, 8, 9, 10, 11, 12, etc.

Unless otherwise specified, all embodiments and optional embodiments of the present application can be combined to form new technical solutions, which should be deemed to be included in the disclosure of this application.

Unless otherwise specified, all technical features and optional technical features of the present application can be combined to form new technical solutions, which should be deemed to be included in the disclosure of this application.

Unless otherwise specified, all steps of the present application can be carried out in sequence or randomly, preferably in sequence. For example, the method includes steps (a) and (b), indicating that the method can include steps (a) and (b) that are sequentially performed, as well as steps (b) and (a) that are sequentially performed. For example, mentioning a method can also include step (c), indicating that step (c) can be added to the method in any order. For example, the method can include steps (a), (b), and (c), as well as steps (a), (c), and (b), and can also include steps (c), (a), and (b).

Unless otherwise specified, the wording such as "comprise/comprising", "include/including", and "contain/containing" adopted in the present application indicates the open-ended mode, but also can be interpreted as the closed-ended mode. For example, "including/comprising" can indicate that other components that are not listed can also be included or comprised, or only listed components can be included or comprised.

Unless otherwise specified, in the present application, the term 'or' is inclusive. For example, the phrase "A or B" means "A, B, or both A and B". More specifically, any of the following conditions satisfy the condition "A or B": A is true (or exists) and B is false (or does not exist); A is false (or non-existent) and B is true (or exists); or both A and B are true (or present).

Unless otherwise specified, the terms used in the present application have commonly known meanings as understood by those skilled in the art.

Unless otherwise specified, the parameters mentioned in the present application can be measured using test methods commonly used in the art, for example, the test methods provided in the present application.

Unless otherwise specified, in the present application, the term "active ion(s)" refers to ions that can repeatedly intercalate into and deintercalate out of between the positive and negative electrodes of the secondary battery. The "active ion(s)" include but not limited to lithium ions.

In the present application, the terms "multiple" and "multiple" refer to two or more than two.

According to different preparation processes or sources, graphite can be divided into artificial graphite and natural graphite. The artificial graphite generally is prepared by a high temperature graphitization process, which is high in energy consumption and cost. Thus, the artificial graphite has a higher cost. Natural graphite comes from nature and thus has the advantage of relatively low cost. In addition, natural graphite has the advantages of high capacity and high compaction density.

Natural graphite mainly includes flake graphite, natural spherical graphite, and microcrystalline graphite. Unlike artificial graphite, natural graphite particles have a lot of pores and defects both internally and externally. During the first charging process of the secondary battery, there are many side reactions between the electrolyte and the pores on the surface and inside the particles, resulting in high irreversible capacity loss, low initial columbic efficiency, and poor cycling performance of the secondary battery. Specifically, flake graphite and natural spherical graphite have high crystallinity and graphitization degree, and have mostly layered microstructure. Such structure leads to significant volume changes in natural graphite during the intercalation and deintercalation of active ions, which is likely to cause the breakage of graphite layered structure and particle breakage. After the particles' breakage, the exposed fresh surface will continue to react with the electrolyte solution, which will further increase the irreversible capacity loss of the secondary battery. In addition, natural graphite has high anisotropy and slow diffusion of active ions, thus leading to poor dynamic performances.

At present, the performance of natural graphite is mainly improved through particle surface coating treatment and/or particle internal filling treatment.

The coating treatment of particle surfaces mainly involves mixing natural graphite and a coating agent (such as asphalt and polymer compounds) evenly before heat treating to coat the surface of natural graphite particles with a layer of amorphous carbon, which can slightly repair the defects on the particle surface. However, the inventors of the present application found during the research process that the amorphous carbon layer coated on the surface can lead to a decrease in the capacity per gram and/or compaction density of natural graphite, affecting the energy density of the secondary battery. At the same time, the amorphous carbon layer applied on the surface cannot effectively prevent the electrolyte from infiltrating into the pore structure inside the particles, resulting in limited improvement in the initial columbic efficiency and cycling performance of the secondary battery.

The internal filling treatment of the particles mainly involves mixing natural graphite with filling agents (such as asphalt, polymer compounds, etc.), and filling the filling agent into the internal pores of particles through preset pressure, vacuuming, and heating, so as to obtain natural graphite without pores inside the particles. However, the inventors of the present application have found during the research that the large amount of carbon in the internal of the particles leads to a decrease in the capacity per gram and compaction density of natural graphite, which affects the energy density of the secondary battery. At the same time, because all the pores inside the natural graphite particles are filled with carbon, the volume of natural graphite changes greatly during the intercalation and deintercalation of active ions, which will render the particles break and further lead to repeated destruction and reconstruction of the SEI film on the surface of the particles; as a result, the consumption of active ions increases, the capacity loss of the secondary battery increases, and the service life of the secondary battery becomes short. In the existing technologies, the surface of natural graphite, without any pores inside the particles thereof, will be applied with a layer of amorphous carbon, which will lead to further reducing of the capacity per gram and/or compaction density of natural graphite. However, due to the many surface defects on the coated particles, the service life of secondary batteries cannot be effectively improved.

Therefore, the irreversible capacity loss of secondary batteries are reduced and the initial columbic efficiency of secondary batteries is increased to some extent by means of the surface coating treatment and/or internal filling treatment of modified natural graphite particles. Nevertheless, the improvement on the initial columbic efficiency of secondary batteries is limited and the energy density of secondary batteries will lose; moreover, the good cycling performance and dynamic performances of the secondary batteries are difficult to be balanced.

In view of the above, the inventors of the present application, after conducting extensive research, propose a new carbon material, which can render the secondary batteries balance high initial columbic efficiency with good cycling and dynamic performances.

Carbon Material

In the first aspect, the present application provides a carbon material comprising a pore structure, wherein the carbon material has 3R and 2H phases and satisfies $0<I_{3R(101)}/I_{2H(004)}\le0.100$, in which $I_{3R(101)}$ is the diffraction peak intensity of 101 crystallographic plane of 3R phase in the X-ray diffraction pattern of the carbon material, and $I_{2H(004)}$ is the diffraction peak intensity of 004 crystallographic plane of 2H phase in the X-ray diffraction pattern of the carbon material.

In the present application, the diffraction peak intensity of 101 crystallographic plane of 3R phase and the diffraction peak intensity of 004 crystallographic plane of 2H phase are represented by the integral area of the corresponding diffraction peaks.

3R (Rhombohedral) phase crystalline carbon is a rhombic phase crystalline carbon with an ABCABC . . . stacking structure; 2H (Hexagon) phase crystalline carbon is a hexagonal phase crystalline carbon with an ABAB . . . stacking structure. During the research process, the inventors have found that under the condition that both 3R phase crystalline carbon and 2H phase crystalline carbon exist in carbon materials, and the ratio of the diffraction peak intensity of 101 crystallographic plane of the 3R phase to the diffraction peak intensity of 004 crystallographic plane of the 2H phase satisfies $0<I_{3R(101)}/I_{2H(004)}\le0.100$, there can be more active sites on the surface of the carbon material particles, which can accelerate the transport of active ions. Moreover, the surface stability of the carbon material particles is relatively high, which can effectively reduce surface side reactions and reduce the consumption of active ions.

The carbon material provided in the present application comprises a pore structure. In the present application, "carbon material comprising a pore structure" refers to a carbon material having the pore structure that can be directly observed from cross-sectional images (such as scanning electron microscope images with particle magnification of 1000 times); that is, the pore structure in the raw material for preparing the carbon material is not fully filled. The pore structure in carbon materials can reserve the expansion space necessary for the volume change of the carbon material particles, thereby reducing the risk of the carbon material particle breakage and generating new interfaces and further reducing the side reactions; as a result, the consumption of active ions is reduced.

Therefore, the carbon material provided in the present application can balance high ion transport performance, high surface stability, and low volume change, thereby enabling the secondary battery comprising the same to balance high initial columbic efficiency, as well as good cycling and dynamic performances.

In some embodiments, $0.005\le I_{3R(101)}/I_{2H(004)}\le0.100$, optionally $0.006\le I_{3R(101)}/I_{2H(004)}\le0.080$, $0.007\le I_{3R(101)}/I_{2H(004)}\le0.072$, $0.008\le I_{3R(101)}/I_{2H(004)}\le0.065$, $0.010\le I_{3R(101)}/I_{2H(004)}\le0.060$. The inventors have found through further research that under the condition that the $I_{3R(101)}/I_{2H(004)}$ of carbon materials is further within the above range, the high initial columbic efficiency, as well as good cycling and dynamic performances of the secondary battery can be balanced.

In some embodiments, the X-ray diffraction pattern of the carbon material does not include a peak position of (012) crystallographic plane of the 3R phase. The carbon material in the present application does not have a (012) crystallographic plane of the 3R phase. Accordingly, the carbon material particles have fewer internal defects, which can further reduce the consumption of active ions and improve the initial columbic efficiency and cycling performance of the secondary battery.

In the present application, in the X-ray diffraction pattern of carbon material, the diffraction peak of 101 crystallographic plane of 3R phase has a 2θ of from 43° to 44°, the diffraction peak of 004 crystallographic plane of 2H phase has a 2θ of from 530 to 55, and the diffraction peak of (012) crystallographic plane of 3R phase has a 2θ of from 46° to 47°.

In some embodiments, the carbon material comprises more than one pore structure having a pore area equal to or greater than 0.15 μm², optionally more than one pore structure having a pore area of from 0.15 μm² to 2.0 μm². In further research, the inventors has found that under the condition that the carbon material includes a pore structure having the aforementioned pore area, the pore structure can reserve the expansion space necessary for the volume change of carbon material particles, thereby further reducing the risk of carbon material particle breakage and generating new interfaces. Accordingly, the side reactions and irreversible capacity loss of secondary batteries are reduced, and the cycling performance of secondary batteries is improved.

In some embodiments, the carbon material comprises an external zone and an internal zone located inside the external zone, the external zone refers to the zone formed by extending a distance of 0.25 L from the surface of the carbon material particles to the inside of the carbon material particles, L refers to the short axis length of the carbon material particles, the external zone has a total pore area denoted as $S_1$, and the internal zone has a total pore area denoted as $S_2$, wherein $S_2>S_1$.

In further research, the inventors have found that under the condition that the carbon material further satisfies $S_2>S_1$, the carbon material particles can have the following characteristics: the number and/or size of the pores in the internal zone are/is large, whereas the number and/or size of the pores in the external zone are/is small. Because the pores in the internal zone have large amount and/or have large pore size, the pore structure can reserve the expansion space necessary for the volume change of the carbon material particles, thereby reducing the risk of the carbon material particle breakage and generating new interfaces. Accordingly, the side reactions and irreversible capacity loss of secondary batteries are reduced, and the cycling performance and the dynamic performances of secondary batteries are improved. Because the pores in the external zone have small amount and/or have small pore size, the carbon material particles have more stable structure, and the infiltration of electrolyte solution into the pore structure inside the carbon material particles is avoided as possibly it can be; as a result, the side reactions are reduced, and further the consumption of active ions by SEI film formation inside the particles is reduced; accordingly, the initial columbic efficiency of carbon materials is improved, and further the cycling performance of secondary batteries is improved.

Therefore, under the condition that the carbon material further satisfies $S_2 > S_1$, the irreversible capacity loss of the secondary battery can be effectively reduced and the capacity exertion characteristics of the secondary battery is improved. Accordingly, the secondary battery can better balance high initial columbic efficiency with good cycling and dynamic performances.

In some embodiments, $1.5 \leq S_2/S_1 \leq 420$, $2 \leq S_2/S_1 \leq 300$, $2.2 \leq S_2/S_1 \leq 250$, $2.5 \leq S_2/S_1 \leq 150$, $2.8 \leq S_2/S_1 \leq 100$. In further research, the inventors have found that under the condition that $S_2/S_1$ still satisfies the above ranges, the high initial columbic efficiency and good cycling and dynamic performances of the secondary battery can be balanced.

In some embodiments, $0.01\ \mu m^2 \leq S_1 \leq 5.0\ \mu m^2$, and optionally, $0.02\ \mu m^2 \leq S_1 \leq 4.5\ \mu m^2$, $0.04\ \mu m^2 \leq S_1 \leq 4.5\ \mu m^2$, $0.08\ \mu m^2 \leq S_1 \leq 4.5\ \mu m^2$, $0.1\ \mu m^2 \leq S_1 \leq 4.5\ \mu m^2$, $0.1\ \mu m^2 \leq S_1 \leq 4.0\ \mu m^2$, $0.1\ \mu m^2 \leq S_1 \leq 3.5\ \mu m^2$. Under the condition that the total pore area of the external zone of the carbon material is within the above ranges, on the one hand, the carbon material particles have a more stable structure, so as to avoid electrolyte solution infiltrating into the pore structure inside the carbon material particles as much as possible. As a result, the side reactions are reduced, and the consumption of active ions due to SEI film formation inside the carbon material particles is reduced. On the other hand, the transport performance of active ions and electrons will not be affected.

In some embodiments, $2.5\ \mu m^2 \leq S_2 \leq 25.0\ \mu m^2$, and optionally, $3.0\ \mu m^2 \leq S_2 \leq 22.5\ \mu m^2$, $3.0\ \mu m^2 \leq S_2 \leq 20.0\ \mu m^2$, $3.0\ \mu m^2 \leq S_2 \leq 17.5\ \mu m^2$, $3.5\ \mu m^2 \leq S_2 \leq 15.0\ \mu m^2$. Under the condition that the total pore area of the internal zone of carbon materials is within the above ranges, sufficient and stable expansion space can be reserved for the volume change of the carbon material particles, reducing the risk of carbon material particle breakage and generating new interfaces, and further reducing the side reactions on the new interface surface and reducing the consumption of active ions by SEI film formation on the new interface surface; accordingly, the capacity and initial columbic efficiency of carbon materials can be improved.

In the present application, the total pore area $S_1$ of the external zone and the total pore area $S_2$ of the internal zone of the carbon material can be obtained by measuring the cross-sectional images of the carbon material.

In the present application, the cross-sectional image of the carbon material includes a cross-sectional image passing through the center of the carbon material particles. The "particle center" refers to a zone with a radius of 0.1 μm extending from the geometric center of the particle to the surface of the particle.

In the present application, the short axis length of a particle refers to the minimum value at which two points on the surface of the particle pass through the geometric center of the particle.

FIG. 1 is a schematic diagram of a cross-sectional image of the particles of carbon material 100 in the present application, and the cross-sectional image passes through the center of the particles of carbon material 100. In FIG. 1, L represents the short axis length of the particles of carbon material 100. The zone formed by extending a distance of 0.25 L from the surface of the particles of carbon material 100 inside the particles is the external zone 101, and the zone inside the external zone 101 is the internal zone 102.

The cross-section of carbon materials can be prepared using a cross-section polishing instrument (such as the IB-09010 CP Argon Ion Cross-Section Polishing Instrument from JEOL Company, Japan); according to JY/T010-1996, the cross-section of the carbon material is scanned using a scanning electron microscope (such as the Sigma 300 Scanning Electron Microscope from ZEISS, Germany); finally, the total pore area $S_1$ of the external zone and the total pore area $S_2$ of the internal zone of the carbon material are calculated using image processing software (such as AVIZO).

In some embodiments, $L \geq 4\ \mu m$, and optionally, $4\ \mu m \leq L \leq 20\ \mu m$, $6\ \mu m \leq L \leq 20\ \mu m$, $8\ \mu m \leq L \leq 20\ \mu m$, $8\ \mu m \leq L \leq 18\ \mu m$, and $8\ \mu m \leq L \leq 16\ \mu m$.

In some embodiments, the area of the pore structure in the external zone of the carbon material is less than $0.15\ \mu m^2$ an optionally less than or equal to $0.10\ \mu m^2$. In further research, the inventors have found that by controlling the area of the pore structure in the external zone of the carbon material to fall within the above range, the external zone of the carbon material can have a dense structure, which can effectively improve the structural stability of the carbon material, avoid electrolyte solution infiltration into the pore structure inside the carbon material particles as much as possible; accordingly, the cycling performance of the secondary battery is effectively improved. Of course, the present application is not intended to limit the areas of all pore structures in the external zone of the carbon material to be less than or equal to $0.15\ \mu m^2$. For example, it is possible to control over 95% and optionally over 99% of the pore structure to have an area of less than or equal to $0.15\ \mu m^2$ and optionally less than or equal to $0.10\ \mu m^2$.

In some embodiments, the internal zone of the carbon material includes more than one pore structures having the area of equal to or greater than $0.15\ \mu m^2$, and optionally more than one pore structures having the area of from $0.15\ \mu m^2$ to $2.0\ \mu m^2$. In further research, the inventors have found that by including the pore structure of the above mentioned size in the internal zone of the carbon material, on the one hand, sufficient and stable expansion space can be reserved for the volume change of the carbon material particles, thereby reducing the risk of carbon material particle breakage; on the other hand, the compaction density of the carbon material and the energy density of secondary batteries are improved.

In some embodiments, the interlayer spacing of the external zone of the carbon material is denoted as $d_1$, and the interlayer spacing of the internal zone of the carbon material is denoted as $d_2$. The carbon material satisfies $d_1 \geq d_2$, and optionally, $d_1 > d_2$.

In the carbon material of the present application, under the condition that the interlayer spacing of the external zone of the carbon material is larger, it is more conducive to the rapid intercalation and deintercalation of active ions, thereby further improving the dynamic performances of the secondary battery. Under the condition that the interlayer spacing in the internal zone of carbon materials is smaller, it is more conducive to improving the capacity per gram and compaction density of the carbon material, thereby further enhancing the energy density of secondary batteries.

In some embodiments, $d_1$ is from 0.33565 nm to 0.33600 nm.

In some embodiments, $d_2$ is from 0.33553 nm to 0.33589 nm.

The interlayer spacing of different zones of carbon materials can be tested using instruments and methods known in the art. For example, High-Resolution Transmission Electron Microscopy (HRTEM) can be used for testing. The test instrument may be Spectra S/TEM Scanning Transmission Electron Microscope from Thermo Fisher Scientific.

In some embodiments, the graphitization degree of the carbon material is from 93% to 98.5%, and optionally from 94% to 98%. Under the condition that the graphitization degree of carbon materials is within the above range, it is beneficial for the secondary batteries to have high energy density and simultaneously have good cycling performance and dynamic performances.

The graphitization degree of carbon materials, a well-known meaning in the art, can be tested using instruments and methods well-known meaning in the art. For example, the test can be conducted on an X-ray diffractometer (such as Bruker D8 Discover). The test can be conducted according to JIS K 0131-1996 and JB/T 4220-2011 to obtain the average interlayer spacing $d_{002}$ of (002) crystallographic planes in the crystal structure of carbon materials. Then, according to the formula $g=(0.344-d_{002})/(0.344-0.3354)\times 100\%$, the graphitization degree is calculated. In the above formula, $d_{002}$ is the average interlayer spacing of (002) crystallographic planes in the carbon material crystal structure expressed in nanometers (nm).

In some embodiments, the morphology of the carbon material includes one or more of blocky, spherical, and quasi-spherical shapes. This is beneficial for improving the compaction density of the negative electrode plate, and further for increasing the energy density of the secondary battery.

In some embodiments, the carbon material includes primary particles. Optionally, primary particles account for ≥50% by number of the carbon material, for example, from 55% to 95%, from 60% to 100%, from 65% to 90%, from 65% to 80%, from 70% to 100%, from 75% to 90%, from 80% to 100%, from 90% to 100%, or from 95% to 100%. Under the condition that the carbon material contain an appropriate proportion of primary particles, it can have high structural stability, which reduces the side reactions and further increases the compaction density of the negative electrode plate. Accordingly, the energy density of the secondary battery is increased.

In some embodiments, the carbon material can be primary particles, that is, the primary particles accounts for 100% of the carbon material.

Both primary and secondary particles have well-known meanings in the art. Primary particles refer to non-agglomerated particles, and secondary particles refer to agglomerated particles formed by the aggregation of two or more than two primary particles. Primary and secondary particles can be distinguished by scanning electron microscopy (SEM) images.

In the present application, the proportion of primary particles in the carbon material can be tested as follows: any one test sample may be taken from the negative electrode film layer, the test is conducted on multiple areas of the test sample, the images of multiple test areas are obtained by scanning electron microscopy, and the proportion of the number of the carbon material particles having the primary particles morphology in each image to the total number of carbon material particles is counted, with the average of multiple counted results is the proportion of primary particles in the carbon material.

In some embodiments, the specific surface area of the carbon material is from 0.6 $\mu m^2/g$ to 2.5 $\mu m^2/g$, and optionally from 0.8 $\mu m^2/g$ to 2.4 $\mu m^2/g$. The carbon material of the present application has a lower specific surface area and lower surface activity, which can reduce the consumption of active ions in SEI film formation, improve the initial columbic efficiency of the carbon material, and improve the cycling performance of the secondary battery.

The specific surface area of carbon materials, having a well-known concept in the art, can be measured using well-known instruments and methods in the art. For example, according to GB/T 19587-2017, it may be tested by the nitrogen adsorption specific surface area analysis test method and be calculated by BET (Brunauer Emmett Teller) method. The nitrogen adsorption specific surface area analysis test method can be conducted on the Tri-Star 3020 specific surface area pore size analysis tester from Micromeritics, United States.

In some embodiments, the volume distribution particle size Dv50 of the carbon material is from 6 μm to 30 μm, and optionally from 8 μm to 25 μm.

Under the condition that the volume distribution particle size Dv50 of the carbon material is within the above ranges, the transport performance of active ions and electrons is advantageously improved, thereby further improving the cycling and dynamic performances of secondary batteries.

In some embodiments, the particle size distribution (Dv90-Dv10)/Dv50 of the carbon material ranges from 0.90 to 1.50, and optionally from 0.90 to 1.45. Under the condition that the particle size distribution (Dv90-Dv10)/Dv50 of the carbon material is within the above ranges, the compaction density of the carbon material is advantageously improved, thereby further enhancing the energy density of secondary batteries.

The volume distribution particle sizes Dv10, Dv50, and Dv90 of carbon materials have the well-known meanings in the art, and they represent the particle sizes corresponding to the cumulative volume distribution percentage of the material reaching 10%, 50%, and 90% respectively. They can be measured using instruments and methods known in the art. For example, according to GB/T 19077-2016 Particle size distribution analysis-Laser diffraction method, the test may be conventionally conducted on a laser particle size analyzer. The test instrument may be the Mastersizer 3000 laser particle size analyzer from Marvin Instruments Limited, UK.

In some embodiments, the tap density of the carbon material is from 0.8 $g/cm^3$ to 1.20 $g/cm^3$, and optionally from 0.85 $g/cm^3$ to 1.18 $g/cm^3$. Under the condition that the tap density of carbon materials is within the above range, the compaction density of the negative electrode plate can be increased, thereby increasing the energy density of the secondary battery. Moreover, the active ion and electron transport performance, and enhance the cycling and/or dynamic performances of secondary batteries can be improved.

The tap density of carbon materials, having a well-known meaning in the art, can be measured using instruments and methods known in the art. For example, according to GB/T 5162-2006, the test may be conducted on a powder tap density tester. The test instrument may be BT-301 tester from Dandong Baite.

In some embodiments, the powder compaction density of the carbon material under a pressure of 5000 kg is from 1.85 g/cm$^3$ to 2.10 g/cm$^3$, and optionally from 1.85 g/cm$^3$ to 2.08 g/cm$^3$. Under the condition that the powder compaction density of the carbon material is within the above range, the compaction density of the negative electrode plate can be increased, thereby increasing the energy density of the secondary battery. Moreover, the active ion and electron transport performance, and enhance the cycling and/or dynamic performances of secondary batteries can be improved.

The powder compaction density of carbon materials, having a well-known meaning in the art, can be measured using instruments and methods known in the art. For example, the test may be conducted on an electronic pressure testing machine (such as UTM7305 electronic pressure testing machine) according to GB/T 24533-2009. The exemplary test method is as follows: 1 g of carbon material powder is weighted and added into a mold with a bottom area of 1.327 cm$^2$, a pressure of 5000 kg is applied, holding for 30 s, then the pressure is released, holding for 10 s, and then the powder compaction density of the carbon material under 5000 kg pressure is recorded and calculated.

In some embodiments, the capacity per gram of the carbon material is from 350 mAh/g to 370 mAh/g, and optionally from 355 mAh/g to 370 mAh/g. Under the condition that the capacity per gram of the carbon material is within the above range, the energy density of secondary batteries is improved.

The capacity per gram of carbon materials has a well-known meaning in the art, and can be tested using methods well-known in the art. The exemplary test method is as follows: a carbon material sample is mixed under stirring with styrene butadiene rubber (SBR) as a binder, sodium carboxymethyl cellulose (CMC) as a thickener, and carbon black as a conductive agent in a mass ratio of 96.2:1.8:1.2:0.8 in an appropriate amount of deionized water as a solvent, to form a uniform negative electrode slurry; the negative electrode slurry is applied evenly on the surface of copper foil as the negative electrode current collector, and is reserved for later use after drying in an oven; ethylene carbonate (EC), methyl ethyl carbonate (EMC), and diethyl carbonate (DEC) are mixed in a volume ratio of 1:1:1 to obtain an organic solvent, and then LiPF$_6$ is dissolved in the aforementioned organic solvent to prepare an electrolyte solution with a concentration of 1 mol/L; afterwards, a metal lithium plate is used as the counter electrode and polyethylene (PE) film is used as the separator, to assemble a CR2430 button battery in an glove box under argon protection; at 25° C., the prepared button battery is firstly discharged to 0.005V at a constant current of 0.15 mA, after standing for 5 minutes, it is discharged to 0.005V at a constant current of 10 μA, then the discharge capacity for initial cycle of the button battery is recorded; afterwards, the button battery is charged to 2.0V at a constant current of 0.3 mA and the charging capacity is recorded. The ratio of the charging capacity of the button battery to the mass of the carbon material sample is the capacity per gram of the carbon material.

Preparation Method

In the second aspect, the present application provides a method for preparing a carbon material, which may be used for preparing the carbon material according to the first aspect of the present application.

The method for preparing a carbon material, comprising the following steps:

Step 1, providing a raw material having multiple pore structures;

Step 2, mixing the raw material with a filling material in a predetermined proportion homogeneously, and then holding at a first temperature $T_1$ for the first time $t_1$ to obtain an intermediate;

Step 3, holding the obtained intermediate at a second temperature $T_2$ for a second time $t_2$ to obtain a carbon material, wherein the carbon material comprises a pore structure, and the carbon material has 3R and 2H phases and satisfies $0 < I_{3R(101)}/I_{2H(004)} \leq 0.100$, in which $I_{3R(101)}$ is the diffraction peak intensity of 101 crystallographic plane of the 3R phase in the X-ray diffraction pattern of the carbon material, and $I_{2H(004)}$ is the diffraction peak intensity of 004 crystallographic plane of the 2H phase in the X-ray diffraction pattern of the carbon material.

In some embodiments, the raw material used for preparing the carbon material includes natural graphite. Optionally, the natural graphite includes one or more of flake graphite, natural spherical graphite, and microcrystalline graphite, and more optionally including natural spherical graphite.

In the present application, "natural spherical graphite" refers to a natural graphite with spherical or quasi-spherical shape, but not all natural graphite particles are controlled to be ideal spheres. In some embodiments, natural spherical graphite with the required particle size and morphology can be obtained by pre-treatment of flake graphite. Optionally, the pre-treatment includes processes such as crushing, grading, spheroidization, and purification.

In some embodiments, the morphology of the raw material includes one or more of spherical and quasi-spherical shapes.

In some embodiments, the volume distribution particle size Dv50 of the raw material is from 6 μm to 30 μm, and optionally from 8 μm to 25 μm. Under the condition that the volume distribution particle size of the raw material are within the above ranges, it is beneficial for subsequent filling treatment.

In some embodiments, the OI value of the raw material is ≥4, and optionally from 4 to 15. Under such circumstances, it is beneficial to for the final prepared carbon materials to have appropriate OI values, which can accelerate the transport of active ions and further improve the dynamic performances of secondary batteries.

In the present application, the OI value of the raw material, having a well-known meaning in the art, can be tested using instruments and methods known in the art. For example, the test may be conducted on an X-ray diffractometer (such as Bruker D8 Discover) according to JIS K 0131-1996 and JB/T 4220-2011 to obtain the X-ray diffraction pattern of the raw material powder. The OI value of the raw material may be calculated based on the formula OI value=$I_{004}/I_{110}$, in which $I_{004}$ is the integral area of the diffraction peak of 004 crystallographic plane of the crystalline carbon in the raw material, and $I_{110}$ is the integral area of the diffraction peak of the 110 crystallographic plane of the crystalline carbon in the raw material.

In some embodiments, the volume distribution particle size Dv50 of the filling material is less than or equal to 6 μm, and optionally from 1 μm to 6 μm, from 2 μm to 5 μm, and from 3 μm to 5 μm. Under such circumstances, it is beneficial for the filling material to enter the pore structure of the raw material, and also further for improving the dispersion uniformity between the filling material and the raw material.

In some embodiments, the soften point temperature of the filling material is from 105° C. to 190° C., and optionally from 105° C. to 180° C., from 105° C. to 175° C., from 105° C. to 170° C., from 105° C. to 165° C., from 105° C. to 160° C., from 105° C. to 155° C., from 105° C. to 150° C., from 110° C. to 180° C., from 110° C. to 175° C., from 110° C. to 170° C., from 110° C. to 165° C., from 110° C. to 155° C., from 110° C. to 150° C., from 115° C. to 180° C., from 115° C. to 175° C., from 115° C. to 170° C., from 115° C. to 165° C., from 115° C. to 165° C., from 115° C. to 160° C., from 115° C. to 155° C., from 115° C. to 150° C., and from 115° C. to 145° C. During the research, the inventors has found that the soften point temperature of the filling material within the above ranges is beneficial to adjusting $I_{3R(101)}/I_{2H(004)}$ to fall within an appropriate range, and further beneficial to adjusting the size and/or number of pores in the external zone and internal zone of the carbon material to fall within an appropriate range.

In some embodiments, the coking value of the filling material is from 20% to 48%, and optionally from 25% to 40%. During the research, the inventors have found that under the condition that the coking value of the filling material is within the above ranges, it is beneficial to adjust $I_{3R(101)}/I_{2H(004)}$ to fall within an appropriate range, and further is beneficial to adjust the pore size and/or pore numbers in the external zone and internal zone of the carbon material to fall within the appropriate range.

In some embodiments, the soften point temperature of the filling material is from 110° C. to 165° C., and the coking value is from 25% to 40%.

In the present application, the coking value of the filling material is a well-known meaning in the art and can be measured using instruments and methods known in the art. For example, it can be determined according to GB/T 8727-2008.

In some embodiments, the filling material includes one or more of coal tar asphalt, petroleum asphalt, polymer compounds, and resins, and optionally includes petroleum asphalt.

In some embodiments, the mass ratio of the filling material to the raw material is (10-40): 100, and optionally (15-30): 100. This is beneficial to adjusting $I_{3R(101)}/I_{2H(004)}$ to fall within the appropriate range, and to adjusting the size and/or number of pores in the external zone and internal zone of the carbon material to fall within the appropriate ranges. Moreover, the following situations can be effectively avoided: under the condition that the mass ratio of the filling material to the raw material is too small, the dispersion uniformity of the filling material and the raw material may deteriorate, and therefore the filling material cannot effectively modify the internal defects of the particles, and cannot effectively prevent the electrolyte solution from infiltrating into the pore structure inside the obtained carbon material particles, so that the initial columbic efficiency and cycling performance of the secondary battery are affected; or under the condition that the mass ratio of the filling material to the raw material is too large, the internal pore structure of the raw material is likely to be completely filled. Accordingly, the volume of the obtained carbon material changes greatly, and the particles are more likely to break; as a result, the consumption of active ions by SEI film formation increases, and the irreversible capacity loss of the secondary battery increases. Under the condition that the mass ratio of filling materials to raw materials is too large, a large amount of filling materials will still remain on the surface of particles, which are likely to aggregate; accordingly, the polymerization process is increased, and the capacity per gram and compaction density of the obtained carbon material are decreased.

By adjusting one or more parameters such as the type, softening point, coking value, and addition amount of the filling material to fall within the above ranges, it is beneficial to adjust $I_{3R(101)}/I_{2H(004)}$ to fall within an appropriate range, and further to adjust the pore size and/or pore number s in the external zone and internal zone of the carbon material to fall within an appropriate range; Moreover, after the filling material is heated to melt, it has a viscosity that is not too high, maintaining good fluidity, and it is not likely to bond the raw material particles, which can reduce the aggregation of raw material particles in the subsequent preparation, thereby reducing the problems such as increases of the surface defects and side reactions on the surface of carbon material particles due to additional depolymerization.

In some embodiments, in step 2, the heating process, in which the raw material and the filling material after being uniformly mixed in a predetermined proportion are heated up to the first temperature $T_1$, is a staged heating process, and optionally includes a first heating process and a second heating process.

In some embodiments, the first heating process involves heating to a temperature of from 200° C. to 300° C. and holding at that temperature for a time of from 1 to 3 hours. During the research, the inventors have found that under the condition that the holding time is within the above range, it is beneficial to adjust the pore size and/or pore numbers in the external zone and internal zone of carbon materials to fall within the appropriate range.

In some embodiments, the second heating process involves heating to the first temperature $T_1$ and holding for the first time $t_1$ at that temperature.

In some embodiments, the first temperature $T_1$ ranges from 700° C. to 1100° C., and optionally from 750° C. to 1100° C., from 800° C. to 1100° C., from 850° C. to 1100° C., from 900° C. to 1100° C., and from 950° C. to 1100° C.

During the research, the inventors have found that under the condition that the first temperature is within the above range, the size and/or number of pores in the external zone and internal zone of carbon materials can be advantageously adjusted to be within an appropriate range. And the following situations can be effectively avoided: under the condition that the first temperature is too low, the filling material may not be fully converted into carbon material, and during the subsequent heat treating in step 3, it will continue to decompose into small molecule substances, resulting in the actual residual carbon in the filling area having a large pore structure, which fails to effectively modify the internal defects of the particles, and also cannot effectively prevent the electrolyte from infiltrating into the pore structure inside the obtained carbon material particles, This further affects the initial columbic efficiency and cycling performance of the secondary battery; Under the condition that the first temperature is too high, the energy consumption during the preparation process of carbon materials increases.

In some embodiments, the first time $t_1$ is from 1 h to 5 h. For example, the first time $t_1$ can be 1 hour, 1.5 hours, 2 hours, 2.5 hours, 3 hours, 3.5 hours, 4 hours, 4.5 hours, 5 hours, or within a range formed by any two of the values above. Optionally, the first time $t_1$ is from 2 h to 4 h.

During the research, the inventors have found that under the condition that the first time is within the above range, the size and/or number of pores in the external zone and internal zone of the carbon material is advantageously adjusted to fall within an appropriate range. Accordingly, the following situations are effectively avoided: the first time is too short, so the filling material may not fully convert into a carbon material and thus will continue to decompose into small molecule substances during the subsequent heat treating in step 3, and therefore, the actual residual carbon in the filling area has many pore structures, which fails to effectively modify the internal defects of the particles, and cannot effectively prevent the electrolyte solution from infiltrating into the pore structure inside the obtained carbon material particles, so that the initial columbic efficiency and cycling performance of the secondary battery are affected; or the first time is too long, so the energy consumption during the preparation of the carbon material increases.

In the staged heating process, the temperature is first raised to a temperature from 200° C. to 300° C. Because the heating temperature is higher than the soften point temperature of the filling material, the filling material melts and softens under heating, and keeping the temperature for 1 to 3 hours allows the filling material to flow and fill into the pore structures of the raw material; then with the temperature raised to the first temperature, the filling material undergoes carbonization reaction, so that the pore structures occupied by the filling material can be filled effectively.

In some embodiments, the heating rate of the first heating process may be from 1° C./min to 10° C./min, and optionally from 1.5° C./min to 8° C./min. During the research, the inventors have found that under the condition that the heating rate is within the above ranges, it is beneficial to adjust the pore size and/or pore numbers in the external zone and internal zone of carbon materials to fall within the appropriate range.

In some embodiments, the heating rate of the second heating process can be from 2° C./min to 10° C./min, and optionally from 2.5° C./min to 8° C./min.

In some embodiments, in step 2, the heat treating can be carried out in a vertical granulation kettle, a horizontal granulation kettle, a vertical reaction kettle, a horizontal reaction kettle, or a drum furnace.

In some embodiments, in step 2, the heat treating atmosphere may be a protective gas atmosphere. The protective gas may include one or more of nitrogen, argon, or helium.

In step 2, by adjusting one or more of the heating rate, first temperature, first time, heating process, etc. to fall within the above range, it is beneficial to adjust the pore size and/or number of pores in the external zone and internal zone of the carbon material to an appropriate range.

In some embodiments, the second temperature $T_2$ is from 1850° C. to 2650° C., and optionally from 1950° C. to 2580° C., from 1950° C. to 2520° C., from 1950° C. to 2480° C., from 1950° C. to 2420° C., from 1950° C. to 2360° C., from 2020° C. to 2580° C., from 2020° C. to 2520° C., from 2020° C. to 2480° C., from 2020° C. to 2420° C., from 2020° C. to 2360° C., from 2100° C. to 2580° C., from 2100° C. to 2520° C., from 2100° C. to 2480° C., from 2100° C. to 2420° C., from 2100° C. to 2420° C., and from 2100° C. to 2360° C.

During the research, the inventors have found that under the condition that the second temperature is within the above range, it is beneficial to adjust $I_{3R(101)}/I_{2H(004)}$ to fall within the appropriate range, and to adjust the pore size and/or pore numbers in the external zone and internal zone of carbon materials to fall within the appropriate range. Moreover, the following situations can be effectively avoided: under the condition that the second temperature is too low, the obtained carbon material has more surface defects and/or bulk defects and thus the $I_{3R(101)}/I_{2H(004)}$ is larger, which leads to a decrease in the surface stability of the carbon material particles and an increase in particle surface side reactions, affecting the initial columbic efficiency and cycle performance of the secondary battery; under the condition that the second temperature is too high, the obtained carbon material cannot contain 3R phase crystalline carbon, and the interlayer spacing of the carbon material is small, which is not beneficial to the transport of active ions, affecting the dynamic performances of the secondary battery.

In some embodiments, the second time $t_2$ is from 1.5 h to 6 h. For example, the second time $t_1$ may be 2 h, 2.5 h, 3 h, 3.5 h, 4 h, 4.5 h, 5 h, 5.5 h, 6 h or within a range formed by any two of the above values. Optionally, the second time $t_2$ is from 2 h to 5 h.

During the research process, the inventors have found that Under the condition that the second time is within the above range, it is beneficial to adjust $I_{3R(101)}/I_{2H(004)}$ to fall within the appropriate range, and to adjust the pore size and/or number of pores in the external zone and internal zone of carbon materials to fall within the appropriate range. Accordingly, the following situations can be effectively avoided: under the condition that the second time is too short, the obtained carbon material has more surface defects and/or bulk defects and $I_{3R(101)}/I_{2H(004)}$ is larger, which leads to a decrease in the surface stability of carbon material particles and an increase in side reactions on the particle surface, and further affects the initial columbic efficiency and cycle performance of the secondary battery; and under the condition that the second time is too long, the obtained carbon material may not contain 3R phase crystalline carbon and the interlayer spacing of the carbon material is small, which is not beneficial to the transport of active ions and affects the dynamic performances of the secondary battery.

In some embodiments, in step 3, the heat treating can be carried out in an intermediate frequency furnace, box type graphitization furnace, Acheson graphitization furnace, continuous graphitization furnace, or inner string graphitization furnace.

In some embodiments, in step 3, the heat treating in the medium frequency furnace and continuous graphitization may be conducted under an atmosphere of protective gas atmosphere. The protective gas may include one or more of nitrogen, argon, or helium.

In step 3, by adjusting the second temperature and/or time to fall within the above ranges, it is beneficial for adjusting $I_{3R(101)}/I_{2H(004)}$ to fall within the appropriate range, and adjusting the pore size and/or number in the external zone and internal zone of the carbon material to fall within the appropriate range, thereby improving the cycling and/or dynamic performances of the secondary battery.

The method for preparing the carbon material of the present application is simple in process, high in safety, does not require preset pressure or vacuum treatment, and does not require additional depolymerization processes during the heat treating process. The carbon material prepared in the present application has fewer surface defects and/or bulk defects. The carbon material can balance high ion transport performance, high surface stability, and low volume change, thereby enabling the secondary battery comprising the same to balance high initial columbic efficiency, and as well good cycling and dynamic performances.

The preparation method of the present application has low cost, high practicality, and is suitable for large to scale production.

Secondary Battery

In the third aspect, the present embodiment provides a secondary battery.

There are no specific restrictions on the types of secondary batteries in the present application, for example, the secondary battery may be a lithium-ion batteries. Normally, the secondary battery comprises a positive electrode plate, a negative electrode plate, and electrolytes.

During the charging and discharging process of the secondary battery, active ions repeatedly intercalate into and deintercalate out of between the positive electrode plate and the negative electrode plate, and the electrolyte plays a role in conducting active ions between the positive electrode plate and the negative electrode plate. There are no specific restrictions on the types of electrolytes in the present application, they can be selected based on actual needs. For example, the electrolytes can be at least one selected from of solid electrolyte and liquid electrolyte (i.e. electrolyte solution). The secondary batteries comprising electrolyte solution and the ones comprising solid electrolytes may further include a separator, which is arranged between the positive electrode plate and the negative electrode plate to separate them.

[Negative Electrode Plate]

In some embodiments, the negative electrode plate includes a negative current collector and a negative film layer arranged on at least one surface of the negative current collector. For example, the negative electrode current collector has two surfaces opposite in the thickness direction thereof, and the negative electrode film layer is arranged on either or both of the two opposite surfaces of the negative electrode current collector.

In some embodiments, the negative electrode film layer comprises the carbon material according to the first aspect of the present application or the carbon material prepared by the method described in the second aspect of the present application. Accordingly, the secondary battery can have high initial columbic efficiency and simultaneously have good cycling and dynamic performances.

In some embodiments, the negative electrode film layer may further include other negative electrode active materials in addition to the aforementioned carbon materials. In some embodiments, the other negative electrode active materials include but are not limited to one or more of conventional natural graphite, artificial graphite, soft carbon, hard carbon, silicon-based materials, tin-based materials, and lithium titanate. The silicon-based material may include one or more of elemental silicon, silicon oxides, silicon carbon composites, silicon nitrogen composites, and silicon alloy materials. The tin-based material may include one or more of elemental tin, tin oxide, and tin alloy materials.

In some embodiments, the negative electrode film layer may optionally include a negative electrode conductive agent. In the present application, the types of negative electrode conductive agents are not specially limited. For example, the negative electrode conductive agent may include one or more of superconducting carbon, conductive graphite, acetylene black, carbon black, Koqin black, carbon dots, carbon nanotubes, graphene, and carbon nanofibers.

In some embodiments, the negative electrode film layer may optionally include a negative electrode binder. In the present application, the type of negative electrode binders is not specially limited. For example, the negative electrode binder may include one or more of styrene butadiene rubber (SBR), water-soluble unsaturated resin SR-1B, waterborne acrylic resin (such as polyacrylic acid PAA, polymethyl acrylic acid PMAA, and polyacrylic acid sodium PAAS), polyacrylamide (PAM), polyvinyl alcohol (PVA), sodium alginate (SA), and carboxymethyl chitosan (CMCS).

In some embodiments, the negative electrode film layer may optionally include other additives. For example, other additives may include thickeners, such as sodium carboxymethyl cellulose (CMC), and PTC thermistor materials.

In some embodiments, the negative current collector may be a metal foil or composite current collector. For example, the metal foil may be a copper foil. For example, the composite current collector may include a polymer material as a base layer and a metal material layer formed on at least one surface of the base layer of polymer material. For example, the metal material may include one or more of copper, copper alloys, nickel, nickel alloys, titanium, titanium alloys, silver, and silver alloys. For example, the base layer of polymer material may include one or more of polypropylene (PP), polyethylene terephthalate (PET), polybutylene terephthalate (PBT), polystyrene (PS), and polyethylene (PE).

The negative electrode film layer is usually formed by applying the negative electrode slurry on the negative electrode current collector, drying, and cold pressing. The negative electrode slurry is usually formed by dispersing the negative electrode active material, optional conductive agent, optional binder, and other optional additives in a solvent and stirring evenly. The solvent may be N-methylpyrrolidone (NMP) or deionized water, but is not limited thereto.

The negative electrode plate does not exclude other additional functional layers other than the negative electrode film layer. For example, in some embodiments, the negative electrode plate described in the present application further includes a conductive primer layer sandwiched between the negative electrode current collector and the negative electrode film layer, arranged on the surface of the negative electrode current collector (for example, composed of a conductive agent and a binder). In some embodiments, the negative electrode plate described in the present application also includes a protective layer covering on the surface of the negative electrode film layer.

[Positive Electrode Plate]

In some embodiments, the positive electrode plate includes a positive current collector and a positive electrode film layer arranged on at least one surface of the positive current collector. For example, the positive electrode current collector has two surfaces opposite in the thickness direction thereof, and the positive electrode film layer is arranged on either or both of the two opposite surfaces of the positive electrode current collector.

The positive electrode current collector may be a metal foil or composite current collector. For example, the metal foil may be an aluminum foil. The composite current collector may include a polymer material as a base layer and a metal material layer formed on at least one surface of the base layer of polymer material. For example, the metal material may include one or more of aluminum, aluminum alloys, nickel, nickel alloys, titanium, titanium alloys, silver, and silver alloys. For example, the base layer of polymer material may include one or more of polypropylene (PP), polyethylene terephthalate (PET), polybutylene terephthalate (PBT), polystyrene (PS), and polyethylene (PE).

The positive electrode film layer typically includes a positive electrode active material, optional binders, and optional conductive agents. The positive electrode film layer is usually formed by applying the positive electrode slurry on the positive electrode current collector, drying, and cold pressing. The positive electrode slurry is usually formed by dispersing the positive electrode active material, optional conductive agent, optional binder, and any other components in a solvent and stirring evenly. The solvent may be N-methylpyrrolidone (NMP), but is not limited thereto. For example, the binder used for the positive electrode film layer may include one or more of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluoroacrylate resin. For example, the conductive agents used for positive electrode film layers may include one or more of superconducting carbon, conductive graphite, acetylene black, carbon black, Koqin black, carbon dots, carbon nanotubes, graphene, and carbon nanofibers.

The positive electrode active material may be a positive electrode active material commonly known in the art for secondary batteries.

Under the condition that the secondary battery of the present application is a lithium-ion battery, the positive electrode active material may include, but are not limited to, one or more of lithium-containing transition metal oxides, lithium-containing phosphates, and the modified compounds thereof. Examples of lithium transition metal oxides may include, but are not limited to, one or more of lithium cobalt oxide, lithium nickel oxide, lithium manganese oxide, lithium nickel cobalt oxide, lithium manganese cobalt oxide, lithium nickel manganese oxide, lithium nickel cobalt manganese oxide, lithium nickel cobalt aluminum oxide, and the modified compounds thereof. The examples of the lithium-containing phosphates may include, but are not limited to, one or more of lithium iron phosphate, the composite materials of lithium iron phosphate and carbon, lithium manganese phosphate, the composite materials of lithium manganese phosphate and carbon, lithium manganese iron phosphate, the composite materials of lithium manganese iron phosphate and carbon, and the modified compounds thereof.

In some embodiments, in order to further improve the energy density of the secondary battery, the positive electrode active material used for lithium to ion batteries can include one or more lithium transition metal oxides and their modified compounds with the general formula $Li_aNi_bCo_cM_dO_eA_f$ $0.8 \leq a \leq 1.2$, $0.5 \leq b < 1$, $0 < c < 1$, $0 < d < 1$, $1 \leq e \leq 2$, $0 \leq f \leq 1$, M is one or more selected from Mn, Al, Zr, Zn, Cu, Cr, Mg, Fe, V, Ti, and B, and A selected is one or more from N, F, S, and Cl.

In some embodiments, as examples, positive electrode active materials for lithium-ion batteries may include one or more of $LiCoO_2$, $LiNiO_2$, $LiMnO_2$, $LiMn_2O_4$, $LiNi_{1/3}Co_{1/3}Mn_{1/3}O_2$ (NCM333), $LiNi_{0.5}Co_{0.2}Mn_{0.3}O_2$ (NCM523), $LiNi_{0.6}Co_{0.2}Mn_{0.2}O_2$ (NCM622), $LiNi_{0.8}Co_{0.1}Mn_{0.1}O_2$ (NCM811), $LiNi_{0.85}Co_{0.15}Al_{0.05}O_2$, $LiFePO_4$, and $LiMnPO_4$.

In the present application, the modification to the above-mentioned positive electrode active materials can be doping modification and/or surface coating modification to the positive electrode active materials.

[Electrolyte]

In some embodiments, the electrolyte is an electrolyte solution, which includes an electrolyte salt and a solvent.

The types of electrolyte salts are not specifically restricted and can be selected according to actual needs.

Under the condition that the secondary battery of the present application is a lithium-ion battery, as an example, the electrolyte salt may include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium difluorosulfonymide (LiFSI), lithium difluorosulfonymide (LiTFSI), lithium trifluoromethanesulfonate (LiTFS), lithium difluorooxalate borate (LiDFOB), lithium dioxalate borate (LiBOB) One or more of lithium difluorinated phosphate ($LiPO_2F_2$), lithium difluorinated oxalate phosphate (LiDFOP), and lithium tetrafluorooxalate phosphate (LiTFOP).

The types of solvents mentioned are not specifically restricted and can be selected according to actual needs. In some embodiments, for example, the solvent may include ethylene carbonate (EC), propylene carbonate (PC), methyl ethyl carbonate (EMC), diethyl carbonate (DEC), dimethyl carbonate (DMC), dipropyl carbonate (DPC), methyl propyl carbonate (MPC), ethylene propyl carbonate (EPC), butyl carbonate (BC), fluoroethylene carbonate (FEC), methyl formate (MF), methyl acetate (MA), ethyl acetate (EA) One or more of propyl acetate (PA), methyl propionate (MP), ethyl propionate (EP), propyl propionate (PP), methyl butyrate (MB), ethyl butyrate (EB), 1,4 to butyrolactone (GBL), sulfolane (SF), dimethyl sulfone (MSM), methyl ethyl sulfone (EMS), and diethyl sulfone (ESE).

In some embodiments, the electrolyte solution may optionally include additives. For example, the additives may include additives for forming negative electrode film, additives for forming positive electrode film, and additives that can improve certain performance of secondary batteries, such as additives that improve overcharging performance of secondary batteries, additives that improve high temperature performance of secondary batteries, and additives that improve low to temperature power performance of secondary batteries.

[Separator]

There are no special limitations on the types of separators in the present application, and any well-known porous structure separator with good chemical and mechanical stability can be selected.

In some embodiments, the material of the separator may include one or more of glass fibers, non to woven fabrics, polyethylene, polypropylene, and polyvinylidene fluoride. The separator can be a single layer thin film or a multi-layer composite thin film. Under the condition that the separator is a multi-layer composite film, the materials of each layer are the same or different.

In some embodiments, the positive electrode plate, the separator, and the negative electrode plate may be made into an electrode assembly through a winding or stacking process.

In some embodiments, the secondary battery may include an outer packaging. The outer packaging may be used to encapsulate the electrode components and electrolytes as mentioned above.

In some embodiments, the outer packaging can be a hard housing, such as a hard plastic housing, aluminum housing, steel housing, etc. The outer packaging can also be a soft bag, such as a bag-type soft bag. The material of the soft bag may be plastic, such as one or more of polypropylene (PP), polybutylene terephthalate (PBT), and polybutylene succinate (PBS).

Figure 2:
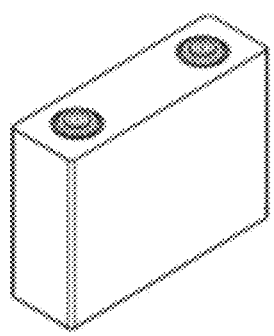
FIG. 2 is a schematic diagram of the secondary battery of one embodiment of the present application.

The shapes of secondary batteries in the present application are not specially limited, and may be cylindrical, cubic, or any other shape. As shown in FIG. 2, a cubic structured secondary battery 5 is used as an example.

Figure 3:
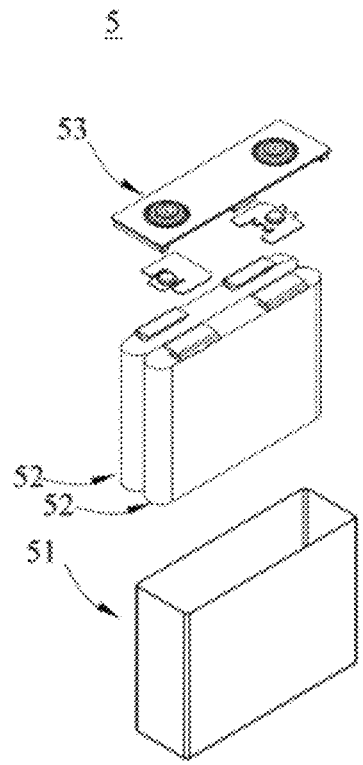
FIG. 3 is an exploded schematic diagram of the secondary battery of one embodiment of the present application.

In some embodiments, as shown in FIG. 3, the outer package may include a shell 51 and a cover plate 53. The shell 51 may include a bottom plate and side plates connected to the bottom plate, and the bottom plate and the side plates enclose an accommodating cavity. The shell 51 has an opening in communication with the accommodating cavity, and the cover plate 53 is closed to the opening to seal the accommodating cavity. The positive electrode plate, the negative electrode plate, and the separator may be wound or stacked to form an electrode assembly 52. The electrode assembly 52 is packaged in the accommodating cavity. The electrolytic solution infiltrates the electrode assembly 52. The secondary battery 5 includes one or more electrode assemblies 52, which may be adjusted according to requirements.

The method for preparing the secondary battery of the present application is well-known. In some embodiments, the positive electrode plate, separator, negative electrode plate, and electrolytic solution may be assembled to form the secondary battery. As an example, the positive electrode plate, separator, and negative electrode plate may form an electrode assembly through a winding or stacking process, the electrode assembly is placed in an outer package and dried, then the electrolytic solution is injected, and the secondary battery is obtained after vacuum packaging, standing, formation, shaping, and other processes.

In some embodiments of the present application, the secondary battery of the present application may be assembled into a battery module. The battery module may include a plurality of secondary batteries, and the specific numbers may be adjusted according to the application and capacity of the battery module.

Figure 4:
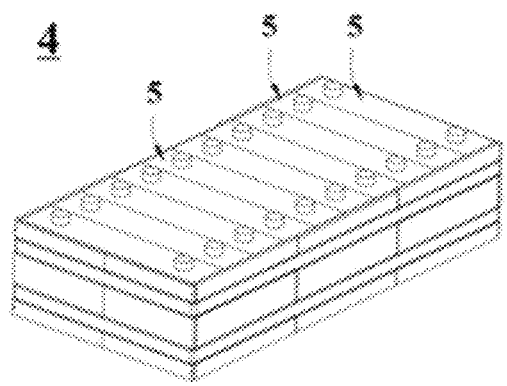
FIG. 4 is a schematic diagram of the battery module of one embodiment of the present application.

FIG. 4 is a schematic diagram of battery module 4 as an example. As shown in FIG. 4, in battery module 4, a plurality of secondary batteries 5 may be arranged in sequence along a length of the battery module 4. Of course, the secondary batteries may alternatively be arranged in any other manner. Further, the plurality of secondary batteries 5 may be fixed by fasteners.

Optionally, the battery module 4 may further include a housing having an accommodating space, and the plurality of secondary batteries 5 are accommodated in the accommodating space.

In some embodiments, the foregoing battery module may alternatively be assembled into a battery pack, and the number of the battery module included in the battery pack may be adjusted according to the application and capacity of the battery pack.

Figure 5:
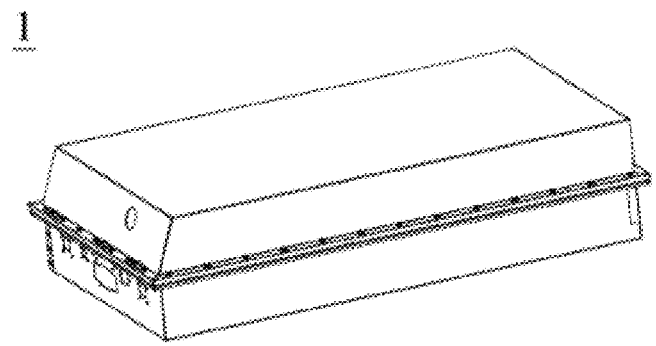
FIG. 5 is a schematic diagram of the battery pack of one embodiment of the present application.
Figure 6:
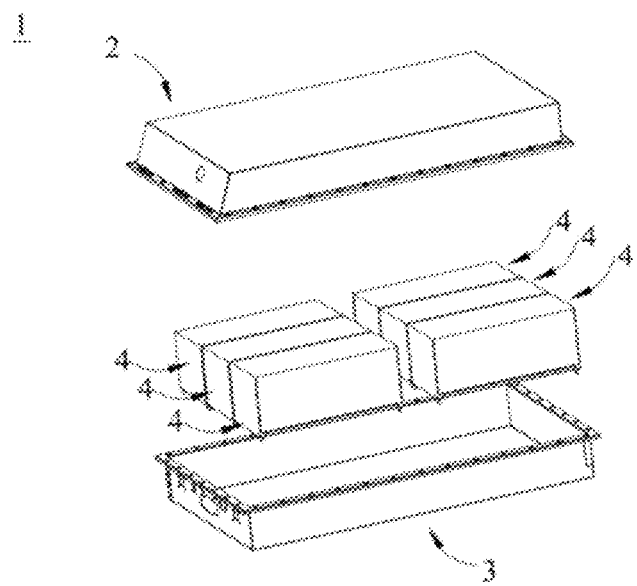
FIG. 6 is an exploded schematic diagram of the battery pack as shown in FIG. 5.

FIGS. 5 and 6 are schematic diagrams of a battery pack 1 as an example. As shown in FIGS. 5 and 6, the battery pack 1 may include a battery box and a plurality of battery modules 4 disposed in the battery box. The battery box includes an upper box body 2 and a lower box body 3. The upper box body 2 covers the lower box body 3 to form a closed space for accommodating the battery modules 4. The plurality of battery modules 4 may be arranged in the battery box in any manner.

Electrical Device

The present application provides an electrical device, comprising at least one of the secondary battery, the battery module, and the battery pack of the present application. The secondary battery, battery module, and battery pack may be used as a power source of the electrical device or as an energy storage unit of the electrical device. The electrical device may be, but is not limited to, a mobile device (such as a mobile phone, a tablet, or a laptop), an electric vehicle (such as a full electric vehicle, a hybrid electric vehicle, a plug-in hybrid electric vehicle, an electric bicycle, an electric scooter, an electric golf cart, or an electric truck), an electric train, a ship, a satellite, an energy storage system, or the like.

The electrical device may be selected as the secondary battery, battery modules, or battery packs according to its usage requirements.

Figure 7:
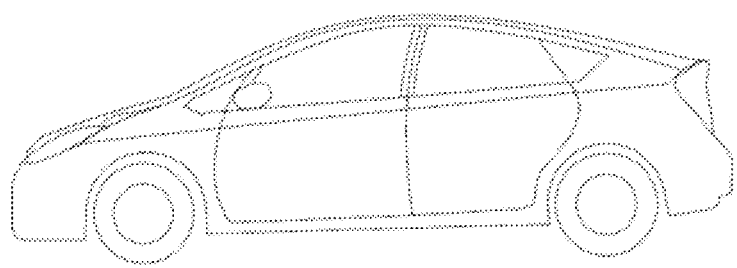
FIG. 7 is a schematic diagram of an electrical device of an embodiment, comprising a secondary battery as a power source according to the present application.

FIG. 7 is a schematic diagram of an electrical device as an example. The electrical device is a full electric vehicle, a hybrid electric vehicle, a plug-in hybrid electric vehicle, or the like. In order to meet the requirements of the electrical device for high power and high energy density, the battery pack or the battery module may be used.

As another example, the electrical device may be a mobile phone, a tablet, a laptop, etc. The electrical device is generally required to be thin and light, so the secondary battery may be used as a power source.

EXAMPLES

The following examples more specifically describe the content disclosed in the present application, and these examples are only used for explanatory description, because various modifications and changes made within the scope of the content disclosed in the present application are apparent to those skilled in the art. Unless otherwise stated, all parts, percentages, and ratios described in the following examples are based on weight, all reagents used in the examples are commercially available or synthesized according to conventional methods and can be directly used without further treatment, and all instruments used in the examples are commercially available.

Example 1

Preparation of Carbon Material

Step 1: 100 mesh flake graphite was mechanical crushed, graded, spheroidized, and purified, to obtain natural spherical graphite having a volume distribution particle size Dv50 of 12 μm and the OI value of 5.5.

Step 2: The obtained natural spherical graphite and petroleum asphalt (having a soften point temperature of 142° C., a volume distribution particle size Dv50 of 5 μm, and a coking value of 35%) were mixed at a mass ratio of 100:20 in a VC mixer for 30 minutes, and then the mixed materials were placed in a drum furnace, where the temperature was raised at a rate of 4° C./min to 220° C. and was kept for 2 hours (the first heating process), and then the temperature was raised at a rate of 5° C./min to 1100° C. and was kept for 1.5 hours (the second heating process). Then, the temperature was cooled to room temperature to obtain the intermediate.

Step 3: The obtained intermediate was placed in the Acheson graphitization furnace, and the temperature was raised to 2320° C. and kept for 3 hours. After demagnetizing and screening, the carbon material was obtained.

(2) Preparation of Button Cell (Half Cell)

The above prepared carbon material was mixed with the styrene butadiene rubber (SBR) as a binder, sodium carboxymethyl cellulose (CMC) as a thickener, and conductive carbon black in an appropriate amount of solvent deionized water in a mass ratio of 96.2:1.8:1.2:0.8, to form a uniform negative electrode slurry; the negative electrode slurry was applied evenly on the surface of the negative electrode current collector copper foil, and was dried in an oven for later use. Ethylene carbonate (EC), methyl ethyl carbonate (EMC), and diethyl carbonate (DEC) were mixed in a volume ratio of 1:1:1 to obtain an organic solvent. Then, $LiPF_6$ was dissolved in the aforementioned organic solvent to prepare an electrolytic solution with a concentration of 1 mol/L. Afterwards, a CR2430 button battery was assembled in an argon protected glove box by using a metal lithium plate as the counter electrode and polyethylene (PE) film as the separator.

(3) Preparation of Secondary Batteries (Full Cell)

The above prepared carbon material, conductive agent carbon black (Super P), styrene butadiene rubber as a binder, and sodium carboxymethyl cellulose as a thickener were mixed in an appropriate amount of solvent deionized water in a weight ratio of 96:1:1:2 to form a negative electrode slurry. The negative electrode slurry was applied onto the two surfaces of the negative electrode current collector copper foil, and after drying and cold pressing, the negative electrode plate was obtained.

$LiFePO_4$, conductive carbon black and polyvinylidene fluoride were mixed in a weight ratio of 96:2.5:1.5, then an appropriate amount of solvent NMP was added under homogeneous stirring, to obtain the positive electrode slurry. The positive electrode slurry was applied onto the two surfaces of the positive electrode current collector aluminum foil, and after drying and cold pressing, the positive electrode plate was obtained.

The polypropylene film having a thickness of 12 μm was used as a separator, and was placed with the positive and negative electrode plates prepared above in sequence, so that the separator was between the positive and negative electrode plates for separation; then they were wound to obtain the electrode assembly; the electrode assembly was placed in the outer packaging and dried, after which the electrolyte solution identical to that for the preparation of the button battery was injected. After vacuum encapsulation, standing, formation, capacity, and other processes, the secondary battery was obtained.

Comparative Example 1

The preparation methods for half cells and full cells are similar to Example 1, except that the preparation process of carbon materials is different.

Mechanical crushing, grading, spheroidization, and purification of 100 mesh flake graphite Were carried out to obtain natural spherical graphite with a volume distribution particle size Dv50 of 12 μm and the OI value of 5.5.

Comparative Example 2

The preparation methods for half cells and full cells are similar to Example 1, except that the preparation process of carbon materials is different.

Mechanical crushing, grading, spheroidization, and purification of 100 mesh flake graphite were carried out to obtain natural spherical graphite with a volume distribution particle size Dv50 of 12 μm and the OI value of 5.5.

The obtained natural spherical graphite and petroleum asphalt (having a soften point temperature of 142° C., a volume distribution particle size Dv50 of 5 μm, and a coking value of 35%) were mixed at a mass ratio of 100:20 in a VC mixer for 30 minutes, and then the mixed materials were graphitized at 3200° C. for 6 hours. After cooled to room temperature, the carbon material was obtained.

Comparative Example 3

The preparation methods for half cells and full cells are similar to Example 1, except that the preparation process of carbon materials is different.

Mechanical crushing, grading, spheroidization, and purification of 100 mesh flake graphite were carried out to obtain natural spherical graphite with a volume distribution particle size Dv50 of 12 μm and the OI value of 5.5.

The obtained natural spherical graphite and petroleum asphalt (having a soften point temperature of 142° C., a volume distribution particle size Dv50 of 5 μm, and a coking value of 35%) were mixed at a mass ratio of 100:20 in a VC mixer for 30 minutes, and then the mixed materials were graphitized at 1300° C. for 3 hours. After cooling to room temperature, the carbon material was obtained.

Comparative Example 4

The preparation methods for half cells and full cells are similar to Example 1, except that the preparation process of carbon materials is different.

Mechanical crushing, grading, spheroidization, and purification of 100 mesh flake graphite were carried out to obtain natural spherical graphite with a volume distribution particle size Dv50 of 12 μm and the OI value of 5.5.

The obtained natural spherical graphite and petroleum asphalt (having a soften point temperature of 142° C., a volume distribution particle size Dv50 of 5 μm, and a coking value of 35%) were mixed in a VC mixer for 30 minutes. Afterwards, the mixed materials were put into the reaction kettle, which were heated stepwise at a heating rate of 2° C./min under evenly stirring. After the temperature was raised to 190° C., the reaction kettle was vacuumed to a pressure of to −0.1 MPa, and held for 2 hours; afterwards, the reaction kettle was heated up to 650° C. and held for 2 hours, then cooled to a temperature of to about 160° C., after which petroleum asphalt was slowly added in the reaction kettle in an amount that was 1:1 in mass relative to the amount of the petroleum asphalt added previously. Then, the reaction kettle was heated to 190° C. again, vacuumed to the pressure of −0.1 MPa, and held for 2 hours; afterwards, it was heated to 650° C. and held for 2 hours, and then cooled via condensation. Last, the materials treated by the above process were heat-treated at 1300° C. for 3 hours, and then were crushed and sieved to obtain a carbon material without internal pores.

Examples 2 to 17

The half cells and full cells were prepared according to the methods similar to Example 1, except that the preparation process parameters of the carbon material were adjusted, as detailed in Table 1.

TABLE 1

| | Filling materials | | | Step 2 | | | | | | Step 3 | |
|---|---|---|---|---|---|---|---|---|---|---|---|
| | | | Mass ratio of natural | First heating process | | | Second heating process | | | | |
| | Soften point temperature | Coking | spherical graphite to petroleum | Heating temperature | Holding temperature | Holding time | Heating temperature | Holding temperature | Holding time | Holding temperature | Holding time |
| Nos. | (° C.) | value | asphalt | (° C./min) | (° C.) | (h) | (° C./min) | (° C.) | (h) | (° C.) | (h) |
| Example 1 | 142 | 35% | 100:20 | 4 | 220 | 2 | 4 | 1100 | 1.5 | 2320 | 3 |
| Example 2 | 142 | 35% | 100:20 | 4 | 220 | 2 | 4 | 1100 | 1.5 | 2000 | 3 |
| Example 3 | 142 | 35% | 100:20 | 4 | 220 | 2 | 4 | 1100 | 1.5 | 2100 | 3 |
| Example 4 | 142 | 35% | 100:20 | 4 | 220 | 2 | 4 | 1100 | 1.5 | 2200 | 3 |
| Example 5 | 142 | 35% | 100:20 | 4 | 220 | 2 | 4 | 1100 | 1.5 | 2250 | 3 |
| Example 6 | 142 | 35% | 100:20 | 4 | 220 | 2 | 4 | 1100 | 1.5 | 2480 | 3 |
| Example 7 | 142 | 35% | 100:20 | 4 | 220 | 2 | 4 | 1100 | 1.5 | 2600 | 3 |
| Example 8 | 142 | 35% | 100:20 | 4 | 220 | 2 | 4 | 1100 | 1.5 | 1300 | 3 |
| Example 9 | 120 | 25% | 100:20 | 4 | 200 | 2 | 4 | 1100 | 1.5 | 2320 | 3 |
| Example 10 | 165 | 40% | 100:20 | 4 | 225 | 2 | 4 | 1100 | 1.5 | 2320 | 3 |
| Example 11 | 180 | 45% | 100:20 | 4 | 250 | 2 | 4 | 1100 | 1.5 | 2320 | 3 |
| Example 12 | 190 | 48% | 100:20 | 4 | 300 | 2 | 4 | 1100 | 1.5 | 2320 | 3 |
| Example 13 | 142 | 35% | 100:10 | 4 | 220 | 2 | 4 | 1100 | 1.5 | 2320 | 3 |
| Example 14 | 142 | 35% | 100:15 | 4 | 220 | 2 | 4 | 1100 | 1.5 | 2320 | 3 |
| Example 15 | 142 | 35% | 100:25 | 4 | 220 | 2 | 4 | 1100 | 1.5 | 2320 | 3 |
| Example 16 | 142 | 35% | 100:30 | 4 | 220 | 2 | 4 | 1100 | 1.5 | 2320 | 3 |
| Example 17 | 142 | 35% | 100:40 | 4 | 220 | 2 | 4 | 1100 | 1.5 | 2320 | 3 |

Performance Tests (1) X-Ray Diffraction Analysis

The X-ray diffraction patterns of carbon materials were obtained by conducting test on an X-ray diffractometer according to JIS K 0131-1996. The test conditions are as follows: the carbon materials were sampled using the flat plate sampling method and were tests under conditions of using CuK α-Ray as radiation source, copper target as the anode target, voltage 40 KV, current 40 mA, anti-scattering slit 1 mm, scanning 2θ angle range as from 20° to 80°, a step size of 0.01671°, a duration of 0.24 seconds per step, and a scanning rate of 4°/min. The test instrument was a Bruker D8 Discover X-ray diffractometer.

2θ of the diffraction peak of 3R phase 101 crystallographic plane was from 43° to 44°, 2θ of the diffraction peak of 2H phase 004 crystallographic plane was from 53° to 55°, and 2θ of the diffraction peak of 3R phase (012) crystallographic plane was from 46° to 47°. The diffraction peak intensity of 101 crystallographic plane of 3R phase and that of 004 crystallographic plane of 2H phase are represented by the corresponding integral area of the diffraction peaks.

(2) Test of the Total Pore Area in the External Zone and Internal Zone of Carbon Materials The binder for sample preparation was evenly mixed with carbon material powder and then the mixture was applied on the copper foil, drying at 60° C. for 30 minutes for later use; the samples were cut into pieces of 6 mm×6 mm and then were pasted on the sample stage of CP Type Argon Ion Cross-Section Polisher; the samples were cut using a plasma beam to obtain the cross-section of the carbon material, the cross-section of the carbon material passed through the center of the carbon material particles. The test instrument may be the IB-09010 CP Argon Ion Cross-Section Polisher from JEOL, Japan.

The cross-section of the carbon materials were scanned using a scanning electron microscope. The test may be conducted according to JY/T010-1996. The test instrument may be Sigma 300 Scanning Electron Microscope from ZEISS, Germany.

The zone formed by extending a distance of 0.25 L from the surface of carbon material particles inside the particles is denoted as the external zone, and the zone inside the external zone is denoted as the internal zone. L represents the short axis length of carbon material particles. Using image processing software, the total pore area $S_1$ of the external zone of the carbon material and the total pore area $S_2$ of the internal zone of the carbon material were calculated. The image processing software may be AVIZO.

(3) Test of the Initial Columbic Efficiency of Carbon Materials

The button battery as prepared above was firstly discharged to current of 0.005V at a constant current of 0.15 mA at 25° C., standing for 5 minutes, and then was discharged to 0.005V at a constant current of 10 μA, the initial cycling discharge capacity of the button battery was recorded; afterwards, it was charged to 2.0V at a constant current of 0.3 mA and the initial cycling charging capacity of the button battery was recorded. The initial columbic efficiency of carbon materials (%)=initial cycling charge capacity of button battery/initial cycling discharge capacity of button battery×100%.

(4) Cycling Performance of Secondary Batteries

At 25° C., the secondary battery as prepared above was charged at a constant current of 1 C to the upper limit cutoff voltage (corresponding to 100% SOC), then charged at the constant voltage to a current of 0.05 C, standing for 5 minutes, and was discharged at a constant current of 1 C to the lower limit cutoff voltage (corresponding to 0% SOC). The discharge capacity of the present time was recorded as the initial cycling discharge capacity. The secondary battery was charged and discharged for cycles according to the above method, and the discharge capacity for each cycle was recorded. Capacity retention rate (%) of secondary battery after 2000 cycles at 25° C.=discharge capacity for the 2000th cycle/the initial cycling discharge capacity×100%.

(5) Maximum Charging Rate Test for Secondary Batteries

At 25° C., the secondary battery was discharged at a constant current of 1 C to the lower limit cut-off voltage (corresponding to 0% SOC). Afterwards it was charged at a constant current of 1 C to the upper limit cut-off voltage (corresponding to 100% SOC), then was charged at the constant voltage until the current is 0.05 C, at which moment the secondary battery was fully charged. After standing for 5 minutes, the fully charged secondary battery was discharged at a constant current of 1 C to the lower cut-off voltage (corresponding to 0% SOC), and the discharge capacity of the present time was the actual capacity of the secondary battery at a rate of 1 C, denoted as C0. The secondary battery was charged to the upper limit cut-off voltage (corresponding to 100% SOC) at a rate of xC0 (representing gradient charging rate, such as 1 C0, 1.05 C0, 1.1 C0, 1.15 C0, 1.2 C0, 1.25 C0, 1.3 C0, 1.35 C0, 1.4 C0 . . . ), and then was charged at the constant voltage until the current is 0.05 C0. After standing for 5 minutes, the secondary battery was disassembled to observe the lithium precipitation on the surface of the negative electrode plate. If there was no lithium precipitation on the surface of the negative electrode plate, increase the charging rate and test again until lithium deposition appears on the surface of the negative electrode plate. Record the maximum charging rate at which no lithium was precipitated on the surface of the negative electrode plate.

satisfies $0.005 \leq I_{3R(101)}/I_{2H(004)} \leq 0.100$, and optionally satisfies $0.008 \leq I_{3R(101)}/I_{2H(004)} \leq 0.065$, the battery could better balance high initial columbic efficiency and good cycling and dynamic performances.

In view of the test results as shown in Table 2, it can be concluded that under the condition that there is no peak position of (012) crystallographic plane of the 3R phase in the X-ray diffraction pattern of carbon materials, the battery could better balance high initial columbic efficiency, good cycling performance, and dynamic performances.

In view of the test results as shown in Table 2, it can be also concluded that under the condition that the carbon material further satisfies $S_2 > S_1$ and optionally satisfies $1.5 \leq S_2/S_1 \leq 420$, the comprehensive performance of the battery was further improved. In this case, the carbon material particles further exhibited the following characteristics: the number and/or size of the pores in the internal zone were large, whereas the number and/or size of the pores in the external zone were small.

The pore structure in the internal zone of carbon materials could reserve the expansion space necessary for the volume change of carbon material particles, thereby reducing the risk of carbon material particle breakage and generating new

TABLE 2

Results of performance tests

| Nos. | $I_{3R(101)}/I_{2H(004)}$ | (012) crystallographic plane of 3R phase, existing or not | $S_2/S_1$ | Initial columbic efficiency | Maximum charging ratio (C0) | Capacity retention rate after cycling |
|---|---|---|---|---|---|---|
| Comparative Example 1 | 0.400 | Yes | 0.85 | 88.3% | 0.70 | 81.0% |
| Comparative Example 2 | 0 | No | 0.88 | 92.1% | 0.90 | 87.5% |
| Comparative Example 3 | 0.210 | Yes | 0.89 | 90.5% | 1.30 | 85.7% |
| Comparative Example 4 | 0.240 | Yes | 0.94 | 92.4% | 1.20 | 83.6% |
| Example 1 | 0.048 | No | 8.10 | 94.0% | 1.45 | 92.5% |
| Example 2 | 0.080 | Yes | 7.90 | 93.1% | 1.55 | 89.8% |
| Example 3 | 0.072 | No | 7.90 | 93.2% | 1.50 | 90.5% |
| Example 4 | 0.061 | No | 8.00 | 93.7% | 1.50 | 91.1% |
| Example 5 | 0.053 | No | 7.90 | 93.7% | 1.45 | 91.5% |
| Example 6 | 0.020 | No | 8.00 | 94.3% | 1.45 | 92.1% |
| Example 7 | 0.006 | No | 8.20 | 94.5% | 1.40 | 92.1% |
| Example 8 | 0.100 | Yes | 7.50 | 92.7% | 1.60 | 88.0% |
| Example 9 | 0.060 | No | 8.10 | 94.5% | 1.40 | 93.1% |
| Example 10 | 0.035 | No | 8.70 | 94.0% | 1.45 | 92.3% |
| Example 11 | 0.021 | No | 9.30 | 93.8% | 1.50 | 91.6% |
| Example 12 | 0.010 | No | 9.60 | 93.8% | 1.55 | 90.8% |
| Example 13 | 0.065 | No | 1.43 | 94.5% | 1.40 | 90.1% |
| Example 14 | 0.050 | No | 4.60 | 94.1% | 1.40 | 92.5% |
| Example 15 | 0.038 | No | 8.70 | 93.8% | 1.50 | 91.6% |
| Example 16 | 0.030 | No | 9.60 | 93.8% | 1.55 | 90.8% |
| Example 17 | 0.023 | No | 9.80 | 93.0% | 1.60 | 90.0% |

The specific surface area, volume distribution particle size, particle size distribution, graphitization degree, tap density, powder compaction density and other parameters of the carbon material prepared in Examples 1 to 17 are all within the range recorded in the specification of the present application.

Figure 8:
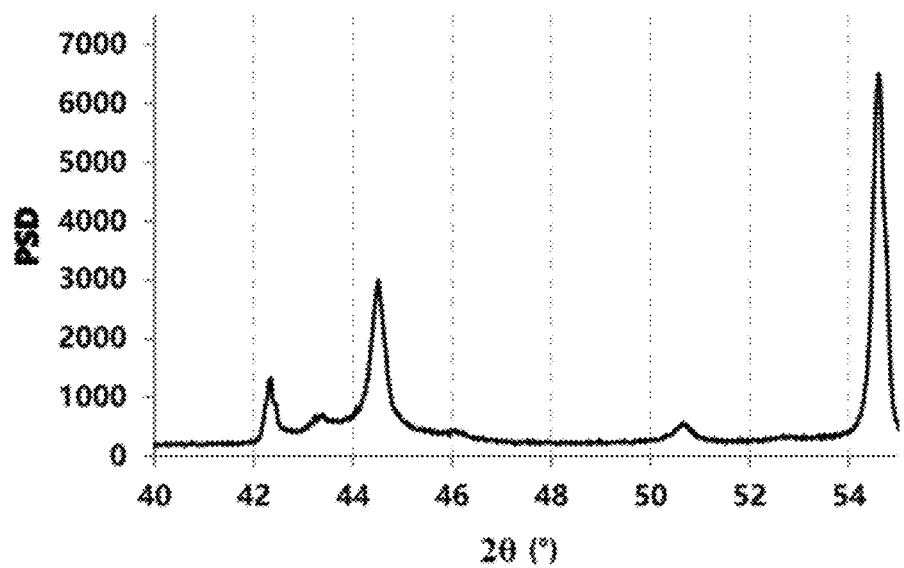
FIG. 8 is the X-ray diffraction pattern of the carbon material prepared in Example 1.

FIG. 8 shows the X-ray diffraction pattern of the carbon material prepared in Example 1. In view of the test results as shown in Table 2, it can be concluded that under the condition that the X-ray diffraction pattern of the carbon material satisfies $0 < I_{3R(101)}/I_{2H(004)} \leq 0.100$, the battery could balance high initial columbic efficiency with good cycling and dynamic performances; and under the condition that the X-ray diffraction pattern of the carbon materials further interfaces, and further reducing the side reactions and the irreversible capacity loss of batteries. Under the condition that the number and/or size of the pores in the external zone were small, the carbon material particles had a more stable structure and the electrolyte infiltration into the pore structure inside the carbon material particles could be avoided as much as possible, thereby reducing the side reactions and the consumption of active ions by SEI film formation inside the particles. Therefore, the carbon materials that further satisfy the above structural characteristics could further enhance the comprehensive performance of the battery.

The carbon materials prepared in a Comparative Examples 1-4 had X-ray diffraction patterns that did not satisfy $0 < I_{3R(101)}/I_{2H(004)} \leq 0.100$, and that none of them could balance high initial columbic efficiency, good cycling performance, and dynamic performances of the battery.

In Comparative Example 1, the untreated natural spherical graphite was used as the carbon material, and the carbon material particles had many pores and defects therein. In view of the test results as shown in Table 2, it can be concluded that the batteries as prepared had poor initial columbic efficiency, cycle performance, and dynamic performances.

The carbon material prepared in Comparative Example 2 was natural spherical graphite having a carbon coating layer on the surface thereof. Due to the high heat treating temperature and long heat treating time, the interlayer spacing of the carbon material is small, which is not beneficial to the transport of active ions. As known from the test results as shown in Table 2, the battery as prepared had poor the dynamic performances; in addition, the coating layer existed only on the surface of natural spherical graphite but failed to achieve effective filling, and thus could not effectively prevent the infiltration of the electrolyte solution into the pore structure inside the particles, resulting in the limited improvement of battery cycling performance.

The carbon material prepared in Comparative Example 3 was natural spherical graphite having a carbon coating layer on the surface thereof. Due to the low heat treating temperature, the main component of the coating layer is amorphous carbon, and there are many surface defects and/or bulk defects in the carbon material; in addition, the coating layer existed only on the surface of natural spherical graphite but failed to achieve effective filling, thus the infiltration of the electrolyte solution into the pore structure inside the particles could not be effectively prevented, resulting in limited improvement of battery cycling performance and dynamic performances.

In Comparative Example 4, when preparing the carbon materials, the filling materials were filled into the entire pore structures of natural spherical graphite particles by vacuum pumping. Due to the low heat treating temperature, there is a large amount of amorphous carbon inside and on the surface of the carbon material particles; moreover, there were no pore structures inside the carbon material particles as obtained. Accordingly, the carbon material, during the deintercalation and intercalation of active ions, had significant volume change, making the particles more likely to break.

As a result, the improvement in the cycling and dynamic performances of the battery was limited. It should be noted that the present application is not limited to the above implementations. The above implementations are only examples, and all implementations having compositions and effects substantially identical to the technical concept of the present application are included in the scope of the present application. In addition, without deviating from the gist of the present application, various variations applied to the implementations that could be conceived by those skilled in the art and other modes constructed by combining some elements of the implementations are also included in the scope of the present application.

What is claimed is:

1. A carbon material comprising carbon material particles, wherein each of the carbon material particles has at least one pore structure having a pore area of from 0.15 μm² to 2.0 μm², the pore structure has a void space, wherein the carbon material has 3R and 2H phases and satisfies $0<I_{3R(101)}/I_{2H(004)} \leq 0.100$, in which $I_{3R(101)}$ is the diffraction peak intensity of 101 crystallographic plane of the 3R phase in the X-ray diffraction pattern of the carbon material, and $I_{2H(004)}$ is the diffraction peak intensity of 004 crystallographic plane of the 2H phase in the X-ray diffraction pattern of the carbon material, the X-ray diffraction pattern of the carbon material does not include a peak position of (012) crystallographic plane of the 3R phase, the carbon material particle comprises an external zone and an internal zone located inside the external zone, the external zone refers to the zone formed by extending a distance of 0.25 L from a surface of the carbon material particle to an inside of the carbon material particle, L refers to the short axis length of the carbon material particles, the external zone has a total pore area denoted as $S_1$, and the internal zone has a total pore area denoted as $S_2$, wherein $S_2 > S_1$.

2. The carbon material according to claim 1, wherein $0.005 \leq I_{3R(101)}/I_{2H(004)} \leq 0.100$.

3. The carbon material according to claim 1, wherein $1.5 \leq S_2/S_1 \leq 420$.

4. The carbon material according to claim 1, wherein
   $0.01\ \mu m^2 \leq S_1 \leq 5.0\ \mu m^2$; and/or
   $2.5\ \mu m^2 \leq S_2 \leq 25.0\ \mu m^2$; and/or
   $L \geq 4\ \mu m$.

5. The carbon material according to claim 1, wherein
   the external zone of the carbon material has at least one pore structure with a pore area of of less than 0.15 m²; and/or
   the internal zone of the carbon material includes more than one pore structure having a pore area of from 0.15 μm² to 2.0 μm².

6. The carbon material according to claim 1, wherein the carbon material satisfies at least one of the following conditions:
   (1) a specific surface area of the carbon material is from 0.6 m²/g to 2.5 m²/g;
   (2) a volume distribution particle size Dv50 of the carbon material is from 6 μm to 30 μm;
   (3) a particle size distribution (Dv90−Dv10)/Dv50 of the carbon material is from 0.90 to 1.50;
   (4) a graphitization degree of the carbon material is from 93% to 98.5%; or
   (5) a morphology of the carbon material includes one or more of blocky, spherical, and quasi-spherical shapes.

7. The carbon material according to claim 1, wherein the carbon material satisfies at least one of the following conditions:
   (1) a tap density of the carbon material is from 0.8 g/cm³ to 1.20 g/cm³;
   (2) a powder compaction density of the carbon material under a pressure of 5000 kg is from 1.85 g/cm³ to 2.10 g/cm³; or
   (3) a capacity per gram of the carbon material is from 350 mAh/g to 370 mAh/g.

8. The carbon material according to claim 1, wherein an interlayer spacing of the external zone of the carbon material is denoted as $d_1$, and an interlayer spacing of the internal zone of the carbon material is denoted as $d_2$, the carbon material satisfies $d_1 > d_2$.

9. The carbon material according to claim 8, wherein
   $d_1$ is from 0.33565 nm to 0.33600 nm; and
   $d_2$ is from 0.33553 nm to 0.33589 nm.

* * * * *